US012706548B2

(12) United States Patent
Kish et al.

(10) Patent No.: US 12,706,548 B2
(45) Date of Patent: Aug. 11, 2026

(54) MODULAR MULTI-LEVEL AC-AC CONVERTER

(71) Applicant: THE GOVERNORS OF THE UNIVERSITY OF ALBERTA, Edmonton (CA)

(72) Inventors: Gregory Kish, Edmonton (CA); Anjana Wijesekera, Edmonton (CA)

(*) Notice: Subject to any disclaimer, the term of this patent is extended or adjusted under 35 U.S.C. 154(b) by 190 days.

(21) Appl. No.: 18/705,903

(22) PCT Filed: Oct. 28, 2022

(86) PCT No.: PCT/CA2022/051602
§ 371 (c)(1),
(2) Date: Apr. 29, 2024

(87) PCT Pub. No.: WO2023/070224
PCT Pub. Date: May 4, 2023

(65) Prior Publication Data

US 2025/0015729 A1 Jan. 9, 2025

Related U.S. Application Data

(60) Provisional application No. 63/273,803, filed on Oct. 29, 2021.

(51) Int. Cl.
*H02M 7/483* (2007.01)
*H02M 5/293* (2006.01)
(Continued)

(52) U.S. Cl.
CPC ....... *H02M 7/4835* (2021.05); *H02M 5/2932* (2021.05); *H02M 5/297* (2013.01); *H02M 7/05* (2021.05)

(58) Field of Classification Search
CPC .................................................. H02M 7/4835
See application file for complete search history.

(56) References Cited

U.S. PATENT DOCUMENTS

2016/0261205 A1* 9/2016 Kolar ...................... H02M 1/32
2018/0083550 A1* 3/2018 Chung ............... H02M 7/5388
(Continued)

FOREIGN PATENT DOCUMENTS

CN 104038077 A 9/2014
CN 203827191 U 9/2014
(Continued)

OTHER PUBLICATIONS

M. Glinka and R. Marquardt, "A new AC/AC multilevel converter family," IEEE Trans. Ind. Electron., vol. 52, No. 3, pp. 662-669, Jun. 2005.

(Continued)

*Primary Examiner* — Sisay G Tiku
(74) *Attorney, Agent, or Firm* — Bennett Jones LLP

(57) ABSTRACT

A modular multilevel AC-AC converter is provided which allows for the direct conversion of AC power between different voltage levels using half-bridge submodules. The converter has a partial power processing topology that exploits internal circulating DC currents to facilitate charge balance of submodule capacitors. This power transfer mechanism eliminates the centralized DC link required in conventional back-to-back modular multilevel converter (B2B-MMC) systems, thus enabling reductions in the semiconductor effort and submodule capacitor energy storage requirements typically required in a B2B-MMC solution. A modulation scheme is also provided for different AC voltage conversion ratios. The converter operation and controls are validated by simulation, and experimentation.

20 Claims, 26 Drawing Sheets

(51) Int. Cl.
*H02M 5/297* (2006.01)
*H02M 7/04* (2006.01)

(56) References Cited

U.S. PATENT DOCUMENTS

| | | | | |
|---|---|---|---|---|
| 2020/0177097 | A1* | 6/2020 | Takahashi | H02M 7/5387 |
| 2021/0075339 | A1 | 3/2021 | Ido et al. | |
| 2021/0135597 | A1 | 5/2021 | Hairo et al. | |
| 2023/0163694 | A1* | 5/2023 | Fujiwara | H02M 7/5395 363/71 |
| 2023/0268845 | A1* | 8/2023 | Zhou | H02M 1/0095 363/132 |
| 2023/0378886 | A1* | 11/2023 | Kikuchi | H02J 3/36 |
| 2024/0235408 | A1* | 7/2024 | Zhou | H02M 7/4835 |
| 2024/0235409 | A1* | 7/2024 | Zhou | H02M 7/487 |
| 2024/0322704 | A1* | 9/2024 | Zhou | H02M 1/0095 |
| 2024/0322708 | A1* | 9/2024 | Zhou | H02M 1/36 |

FOREIGN PATENT DOCUMENTS

| | | | | |
|---|---|---|---|---|
| CN | 203827192 U | | 9/2014 | |
| CN | 203827194 U | | 9/2014 | |
| CN | 105470958 A | | 3/2019 | |
| CN | 105490552 B | | 8/2019 | |
| CN | 112165127 A | | 6/2021 | |
| CN | 110341728 B | * | 1/2024 | H02J 3/383 |
| WO | 2023070224 A1 | | 5/2023 | |

OTHER PUBLICATIONS

L. Baruschka and A. Mertens, "A New Three-Phase AC/AC Modular Multilevel Converter With Six Branches in Hexagonal Configuration," IEEE Trans. Ind. Appl., vol. 49, No. 3, pp. 1400-1410, May 2013.

Z. He, P. Guo, Z. Shuai, Q. Xu, A. Luo, and J. M. Guerrero, "Modulated Model Predictive Control for Modular Multilevel AC/AC Converter," IEEE Trans. Power Electron., vol. 34, No. 10, pp. 10359-10372, Oct. 2019.

P. Blaszczyk, "Hex-Y—A New Modular Multilevel Converter Topology for a Direct AC-AC Power Conversion," 2018 20th Eur. Conf. Power Electron. Appl. EPE18 ECCE Eur., 2018.

M. Lei et al., "A Single-Phase Five-Branch Direct AC-AC Modular Multilevel Converter for Railway Power Conditioning," IEEE Trans. Ind. Electron., vol. 67, No. 6, pp. 4292-4304, Jun. 2020.

M. Tanta, J. G. Pinto, V. Monteiro, A. P. Martins, A. S. Carvalho, and J. L. Afonso, "Topologies and Operation Modes of Rail Power Conditioners in AC Traction Grids: Review and Comprehensive Comparison," Energies, vol. 13, No. 9, Art. No. 9, Jan. 2020.

B. Li, J. Hu, S. Zhou, and D. Xu, "Hybrid back-to-back MMC system for variable speed AC machine drives," CPSS Trans. Power Electron. Appl., vol. 5, No. 2, pp. 114-125, Jun. 2020.

F. Qin, T. Hao, and F. Gao, "A Railway Power Conditioner Using Direct AC-AC Modular Multilevel Converter," in 2019 2nd International Conference on Smart Grid and Renewable Energy (SGRE), Nov. 2019, pp. 1-5.

T. Soong and P. W. Lehn, "Internal Power Flow of a Modular Multilevel Converter With Distributed Energy Resources," IEEE J. Emerg. Sel. Top. Power Electron., vol. 2, No. 4, pp. 1127-1138, Dec. 2014.

S. Du, A. Dekka, B. Wu, and N. Zargari, Modular multilevel converters: analysis, control, and applications. John Wiley & Sons, 2017.

M. Tanta et al., "Simplified rail power conditioner based on a half-bridge indirect AC/DC/AC Modular Multilevel Converter and a V/V power transformer," in IECON 2017—43rd Annual Conference of the IEEE Industrial Electronics Society, Oct. 2017, pp. 6431-6436. Link : https://ieeexplore-ieee-org.login.ezproxy.library.ualberta.ca/document/8217120.

J. Zhang, Z. Wang and S. Shao, "A three-phase modular multilevel DC-DC converter for power electronic transformer applications", IEEE J. Emerg. Sel. Topics Power Electron., vol. 5, No. 1, pp. 140-150, Mar. 2017.

L. Liu and N. Dai, "Hybrid railway power conditioner based on half-bridge modular multilevel converter," in 2016 IEEE Energy Conversion Congress and Exposition (ECCE), Sep. 2016, pp. 1-7. Link : https://ieeexplore-ieee-org.login.ezproxy.library.ualberta.ca/document/7855177.

S. Angkititrakul and R. W. Erickson, "Control and implementation of a new modular matrix converter," in Nineteenth Annual IEEE Applied Power Electronics Conference and Exposition, 2004. APEC '04., Feb. 2004, vol. 2, pp. 813-819 vol.2 Link : https://ieeexplore-ieee-org.login.ezproxy.library.ualberta.ca/document/1295916.

J. A. Ferreira, "the Multilevel Modular DC Converter," IEEE Trans. Power Electron., vol. 28, No. 10, pp. 4460-4465, Oct. 2013.

M. A. Perez, J. Rodriguez, E. J. Fuentes, and F. Kammerer, "Predictive Control of AC-AC Modular Multilevel Converters," IEEE Trans. Ind. Electron., vol. 59, No. 7, pp. 2832-2839, Jul. 2012. Link : https://ieeexplore-ieee-org.login.ezproxy.library.ualberta.ca/document/5875882.

P. Bravo, J. Pereda, M. M. C. Merlin, S. Neira, T. Green, and F. Rojas, "Modular Multilevel Matrix Converter as Solid State Transformer for Medium and High Voltage Substations," IEEE Trans. Power Deliv., pp. 1-1, 2022.

M. Lei et al., "Full Degree of Freedom Based Control Scheme of the Single-Phase Direct AC-AC Modular Multilevel Converter for Railway Power Conditioning Under Asymmetric Branch Conditions," IEEE Trans. Ind. Electron., vol. 67, No. 3, pp. 1671-1683, Mar. 2020 Link: https://ieeexplore-ieee-org.login.ezproxy.library.ualberta.ca/document/8667038.

M. Lei, Y. Li, Z. Li, F. Xu, C. Zhao, and P. Wang, "A Single-Phase Direct AC-AC Modular Multilevel Converter for Railway Power Conditioning," in 2018 20th European Conference on Power Electronics and Applications (EPE'18 ECCE Europe), Sep. 2018, p. P.1-P.10 Link: https://ieeexplore-ieee-org.login.ezproxy.library.ualberta.ca/document/8515373.

* cited by examiner

MODULAR MULTI-LEVEL AC-AC CONVERTER

CROSS-REFERENCE TO RELATED APPLICATIONS

The present application claims the priority benefit of U.S. Provisional Application 63/273,803, filed on Oct. 29, 2021, the entire contents of which are incorporated herein by reference.

FIELD

The present invention relates to power electronics, and more particularly to modular multi-level AC-AC converters for power system applications.

BACKGROUND

With the advancement of high voltage direct current (HVDC) transmission technologies, modular multilevel converters (MMCs) have become a prominent converter technology for high voltage and medium voltage applications due to the benefits they offer—i.e., high flexibility in controlling, scalability, redundancy, low harmonic content, and low losses. Further, the utilization of MMC technology has been extended to many different applications including AC-AC (i.e., alternating current to alternating current) converters.

Proposed AC-AC MMCs can be broadly classified into two subcategories. The first subcategory is direct AC-AC converters, such as modular multilevel matrix converter and hexverter. The second subcategory is indirect converters such as back-to-back MMC (B2B-MMCs) and MMC based solid state transformer (MMC-SST).

In the first subcategory, the direct AC-AC converters typically require full-bridge submodules and are most often used to interface AC systems with different frequencies. Elaborate controls are needed to facilitate the same frequency operation.

Alternatively, in the second subcategory, the B2B-MMC and MMC-SST can interface two AC systems of different or similar frequencies using half-bridge submodules. In these converters, the two AC systems are decoupled through an intermediate DC (direct current) link (e.g., B2B-MMC) and a high frequency transformer (e.g., MMC-SST) which offers significant operational flexibility. However, this approach utilizes a multi-stage AC/DC and DC/AC conversion process because multiple separate DC-AC MMCs with full rated power are required. Moreover, simplified versions of B2B-MMCs which reduce the number of submodules have been proposed but do not practice partial power processing, which limits the reduction in semiconductor effort.

SUMMARY OF THE INVENTION

Broadly, in one aspect, the present invention comprises a modular multilevel converter (MMC) for direct AC-AC voltage level conversion in AC power systems using a single converter structure or module comprising half-bridge submodules. This is achieved by manipulating circulating DC currents within the converter structure or "module" to exchange average power between adjacent switching cells as needed to accomplish internal capacitor energy balance. This power transfer mechanism utilizes the principle of orthogonality of power flow at different frequencies, i.e., the active powers generated at different frequencies sum to zero at steady state [Reference no. 9]. The converter is a partial power processing topology and therefore can realize reduced total semiconductor rating, lower losses and smaller footprint in comparison to conventional B2B-MMCs for AC power system applications. The converter is suited for distribution and transmission level applications in AC power systems. Embodiments of the converter structure or module may also include submodules of types other than half-bridge submodules. For example, the converter structure may comprise full-bridge sub-modules, which may be used to enable bi-directional fault blocking, and/or achieving AC step ratios of about unity, i.e. $G_v=1$. The converter's operating principle is analyzed and a controller structure is described, and the operation of the converter is validated by simulation, and confirmed by experimentation on a laboratory prototype.

Thus, in one aspect, the present invention comprises a modular multilevel converter for AC to AC power conversion. The converter comprises an input terminal for connection to an input AC system, an output terminal for connection to an output AC system, and at least one converter module. The at least one converter module comprises a circuit loop and a filter. The circuit loop is connected to the input terminal, and comprises a first phase leg and a second phase leg. Each of the first and second phase legs comprises an upper arm and a lower arm. The upper arm comprises an upper set of one or a plurality of series-connected half-bridge submodule(s). The lower arm comprises a lower set of one or a plurality of series-connected half-bridge submodule(s). Within each of the first and second phase legs, the upper and lower sets are connected in series with each other at a connection point, and oppositely oriented to each other to allow for DC power exchange between the upper and lower arm for charge balancing between capacitors of the half-bridge submodule(s) of the upper set, and capacitors of the half-bridge submodule(s) of the lower set. The half-bridge submodules of the upper and lower arms of the first phase leg and the half-bridge submodules of the upper and lower arms of the second phase leg are oriented to allow for flow of a circulating current through the first and second phase legs of the current loop. The filter is connected in series with, and in between the first connection point and the second connection point, and connected to the output terminal. The filter comprises one or more components adapted to impede flow of DC current from the first and second connection point of the circuit loop to the output terminal, while allowing flow of AC current from the first and second connection points of the circuit loop to the output terminal. In embodiments, the one or more components of the filter may comprise one or more of capacitor(s), inductor(s) resistor(s), active submodules such as half-bridge submodules, or a combination of the foregoing.

In another aspect, there is provided a modular multilevel converter (MMC) for AC to AC power conversion, the converter comprising an input terminal for receiving input AC current, an output terminal for outputting output AC current, and at least one converter module comprising: (a) a circuit loop connected to the input terminal, and comprising at least one phase leg, wherein each of the at least one phase leg comprises: (i) an upper arm comprising an upper set of at least one series-connected half-bridge submodule; and (ii) a lower arm comprising a lower set of at least one series-connected half-bridge submodule, wherein, within each of the at least one phase leg, the upper and lower sets are connected in series with each other at a connection point, and oppositely oriented to each other to allow for DC power exchange between the upper and lower arm for charge balancing between capacitors of the at least one half-bridge submodule of the upper set and capacitors of the at least one half-bridge submodule of the lower set; and (b) a filter connected to the connection point and the output terminal, wherein the filter comprises one or more components allowing flow of AC current from the connection point of the circuit loop to the output terminal.

In still another aspect, there is provided a method for operating a modular multilevel converter (MMC) for AC to AC power conversion, the method comprising: applying input AC current at an input terminal of at least one converter module of the converter, wherein the at least one converter modules comprises: (a) a circuit loop connected to the input terminal, and comprising at least one phase leg, wherein each of the at least one phase legs comprises: (i) an upper arm comprising an upper set of at least one series-connected half-bridge submodule; and (ii) a lower arm comprising a lower set of at least one series-connected half-bridge submodule, wherein, within each of the at least one phase leg, the upper and lower sets are connected in series with each other at a connection point and oppositely oriented to each other to allow for DC power exchange between the upper and lower arm for charge balancing between capacitors of the at least one half-bridge submodule of the upper set and capacitors of the at least one half-bridge submodule of the lower set: (b) a filter connected to the connection point and an output terminal of the converter, wherein the filter comprises one or more components to allow for flow of AC current from the connection point of the circuit loop to the output terminal; and generating converted output AC current at the output terminal.

In still yet another aspect, there is provided a modular multilevel converter (MMC) for AC to AC power conversion, the converter comprising an input terminal for receiving input AC current, an output terminal for outputting output AC current, and at least one converter module comprising: (a) a circuit loop connected to the input terminal, and comprising at least one phase leg, wherein each of the at least one phase leg comprises: (i) an upper arm comprising an upper set of at least one series-connected capacitor-based switching submodule; and (ii) a lower arm comprising a lower set of at least one series-connected capacitor-based switching submodule, wherein, within each of the at least one phase leg, the upper and lower sets are connected in series with each other at a connection point, and oppositely oriented to each other to allow for DC power exchange between the upper and lower arm for charge balancing between capacitors of the at least one capacitor-based switching submodule of the upper set and capacitors of the at least one capacitor-based switching submodule of the lower set; and (b) a filter connected to the connection point and the output terminal, wherein the filter comprises one or more components allowing flow of AC current from the connection point of the circuit loop to the output terminal.

In still a further aspect, there is provided a method for operating a modular multilevel converter (MMC) for AC to AC power conversion, the method comprising: applying input AC current at an input terminal of at least one converter module of the converter, wherein the at least one converter modules comprises: (a) a circuit loop connected to the input terminal, and comprising at least one phase leg, wherein each of the at least one phase legs comprises: (i) an upper arm comprising an upper set of at least one series-connected capacitor-based switching submodule; and (ii) a lower arm comprising a lower set of at least one series-connected capacitor-based switching submodule, wherein, within each of the at least one phase leg, the upper and lower sets are connected in series with each other at a connection point and oppositely oriented to each other to allow for DC power exchange between the upper and lower arm for charge balancing between capacitors of the at least one capacitor-based switching submodule of the upper set and capacitors of the at least one capacitor-based switching submodule of the lower set: (b) a filter connected to the connection point and an output terminal of the converter, wherein the filter comprises one or more components to allow for flow of AC current from the connection point of the circuit loop to the output terminal; and generating converted output AC current at the output terminal.

Additional embodiments of modular multilevel converters for AC-AC power conversion, and related methods of AC-AC power conversion are described below. Further, embodiments of controllers for use with such converters, and related methods of controlling such converters are described below.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 13A shows an embodiment of a common mode current controller. FIG. 13B shows an embodiment of a second harmonic current suppression controller. FIG. 13C shows an embodiment of a common mode capacitor voltage controller. FIG. 13D shows a differential mode capacitor voltage controller.

FIG. 20A is for the upper arm; and FIG. 20B is for the lower arm.

DETAILED DESCRIPTION OF EMBODIMENTS

Overview

The present invention generally relates to power electronics, and more particularly to MMC AC-AC converters for power system applications.

In more detail, embodiments herein relate to a class of modular multilevel AC/AC converters (also referenced herein as MMC AC-AC converters, or M2AC converters) which allow the direct conversion of AC power between different voltage levels. In contrast to existing converter topologies, which use multiple converter structures (e.g., AC/DC and DC/AC), the proposed MMC AC-AC converter can achieve direct AC voltage level conversion, in AC power systems, using a single converter structure with only half-bridge submodules (HBSMs). In at least one example, this is achieved through using a partial power processing topology, which manipulates circulating DC currents within the converter structure to exchange average power between adjacent HBSM switching cells as needed to accomplish internal capacitor energy balance. To this end, a circulating current loop facilitates average power shuttling between an upper arm and lower phase arm in order to achieve charge balance of the internal capacitors.

As explained, this power transfer mechanism utilizes the concept of orthogonal power components. The arm current can contain at least two different frequency components to obtain orthogonal power components, which makes the room for generating power at one frequency while absorbing power at the other frequency. Given that the input and output currents of the converter are a fundamental frequency AC, the circulating current of the MMC converter includes a DC component.

In some examples, this power transfer mechanism eliminates the centralized DC link required in conventional back-to-back modular multilevel converter (B2B-MMC) systems, In some examples, the same above-described concept can be realized using other types of switching submodules than HBSMs (e.g., full-bridge submodules or the like).

As further provided, the provided MMC AC-AC converter can assist in realizing reduced total semiconductor rating, reduction in semiconductor effort and/or submodule capacitor energy storage requirements, lower losses and smaller footprint in comparison to conventional B2B-MMCs for AC power system applications.

In at least one embodiment, a modulation scheme is used for different AC voltage level conversion ratios. The MMC AC-AC operation and controls are validated by simulation, and experimental validation is presented for a 135/67 Vrms, 0.8 KW laboratory prototype.

Figure 1A:
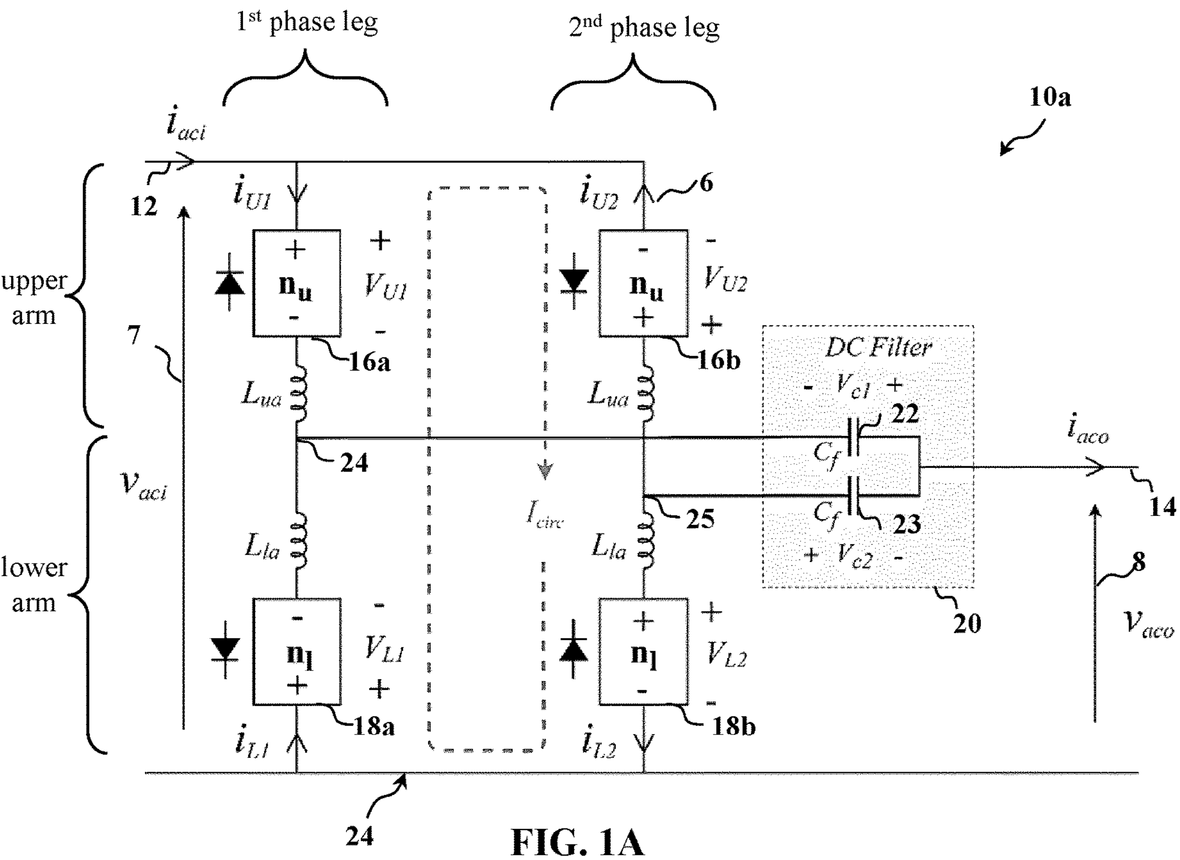
FIG. 1A shows a circuit topology for a first embodiment of a MMC AC-AC converter of the present invention, having two MMC phase legs.
Figure 1B:
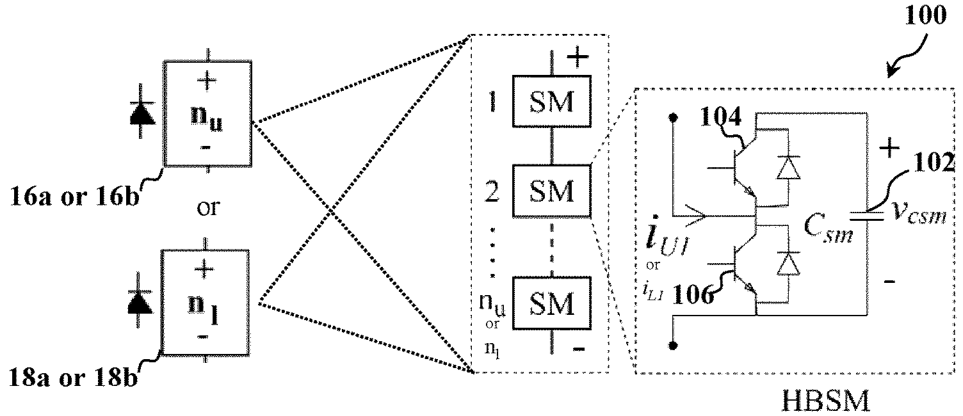
FIG. 1B shows a circuit topology of a half-bridge submodule of the converter topology of FIG. 1A.
Figure 2:
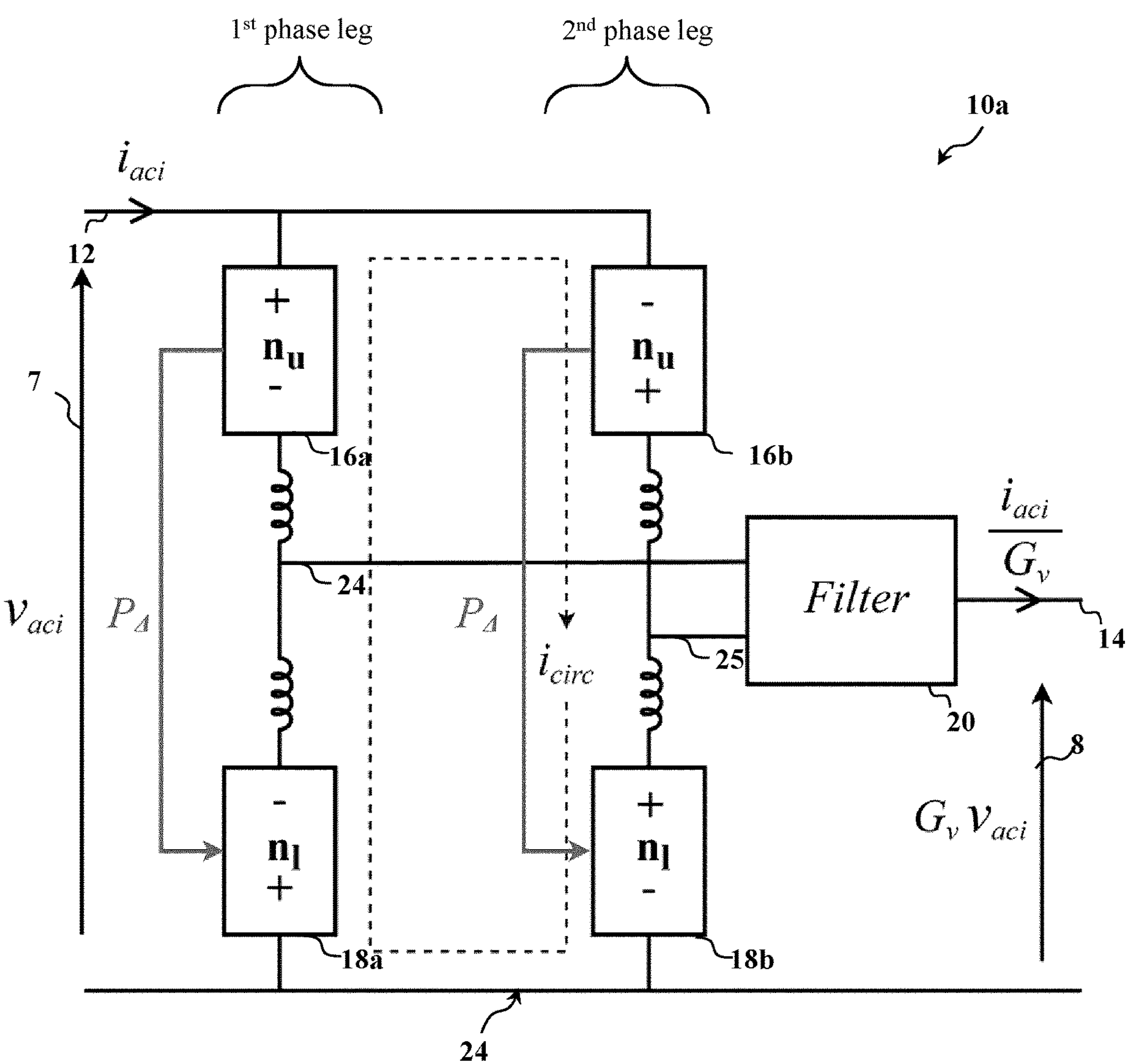
FIG. 2 shows simplified view of the converter topology of FIG. 1A to illustrate an inter-arm DC power exchange between arms.

The MMC AC-AC converter is now described herein with reference to the accompanying drawings of FIGS. 1-8, 24, and 27 showing topologies of embodiments of the MMC AC-AC converter, or portions thereof, using conventional symbols, for electrical circuit diagrams as will be understood by persons of ordinary skill in the art. In these drawings, arrow heads, such as arrowhead (6) in FIG. 1A and the like, that are placed along the circuit lines show the direction of positive current flow according to conventional current notation in the field, when the converter is in use: it will be understood that actual electron flow is in the direction opposite to the direction of the arrow heads, when the converter is in use. In FIGS. 1A and 2, the arrow lines (7, 8) adjacent the notation $V_{aci}$ and $V_{aco}$, respectively, indicate voltage polarity, with the head of the arrow lines (7, 8) indicating the positive end. In FIGS. 1-8, 24, and 27, the polarity of voltages associated with certain components of the converter are also shown explicitly with (+) and (−) symbols. For example, in FIG. 1A, the (+) and (−) symbols above and below the notation $V_{U1}$ indicate the positive and negative ends of a set (16*a*) of half-bridge submodules.

In the following description and the accompanying drawings, the term "upper" or the subscripts (U) or (u), in contrast with the term "lower" or the subscripts (L) or (l), may be used to differentiate between different arms of phase legs of a modular multilevel converter, and parameters (e.g., voltage, and current) describing their properties or operation. As is known in the art, the terms "upper" and "lower" are used for convenience because of the relative position of arms shown in the circuit topologies, or of submodules thereof, but do not prescribe any relative elevation of the parts. Accordingly, the terms "upper" and "lower" may be interchanged with other descriptive terms, such as "first" and "second".

DEFINITIONS

Any term or expression not expressly defined herein shall have its commonly accepted definition understood by a person skilled in the art.

"Half-bridge submodule" or "HBSM", as used herein, refers to a circuit comprising a capacitor and a pair of switches operable in a complementary manner (i.e., a first switch in an open state, and the second switch in a closed state, or vice versa) to either insert the capacitor in a series circuit, or isolate and bypass the capacitor in the same series circuit.

Figures 28A, 28B:
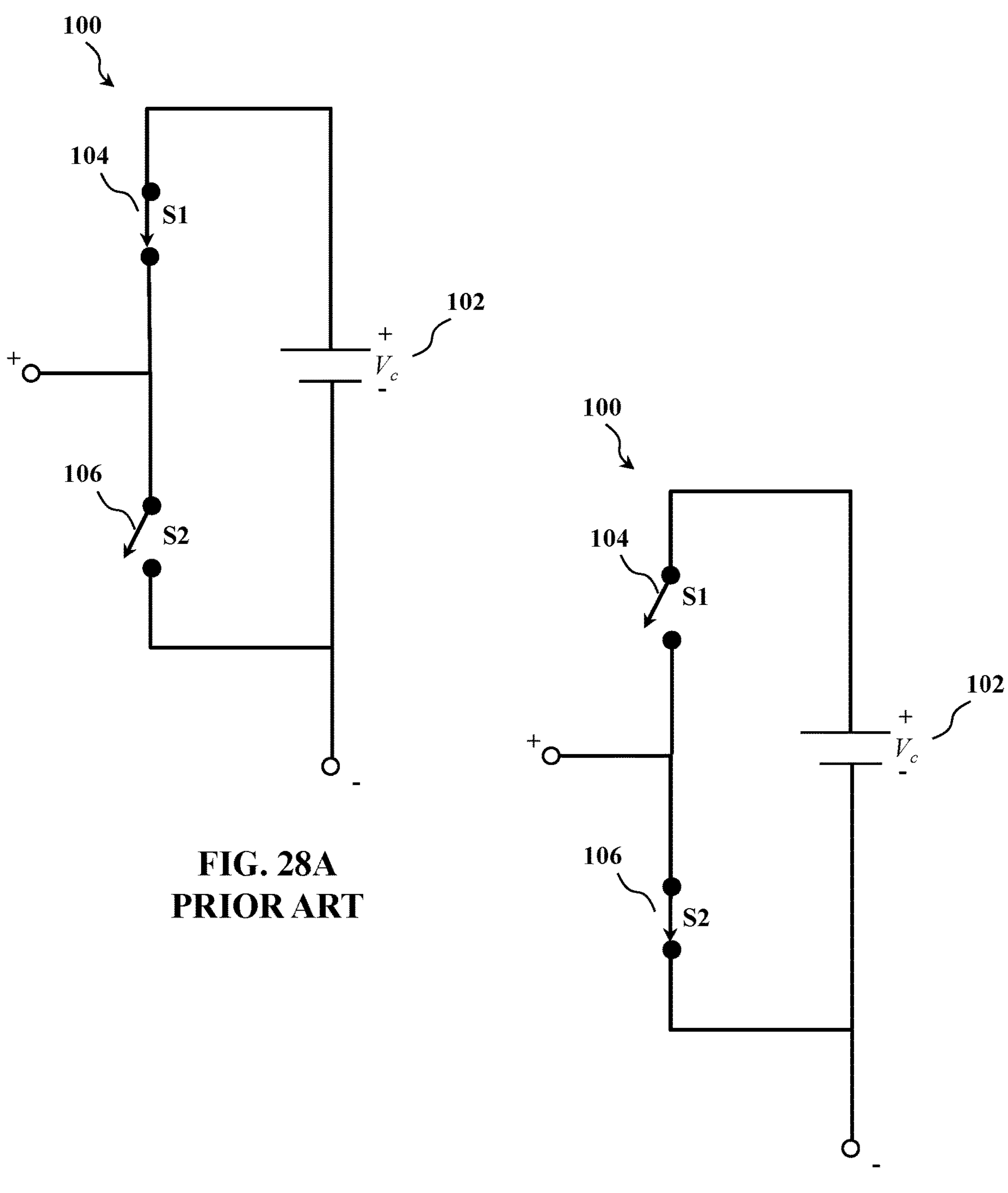
FIGS. 28A and 28B shows a circuit topology for a prior art half-bridge submodule, with the switches thereof configured to insert the capacitor thereof into a series circuit (FIG. 28A), or to isolate and bypass the capacitor thereof from the same series circuit (FIG. 28B).

FIG. 1B shows a circuit diagram for a half-bridge submodule (100), with the switches (104, 106) thereof implemented by transistors and anti-parallel diodes. As another non-limiting illustrative example, FIGS. 28A and 28B shows a circuit topology for a prior art half-bridge submodule (100) comprising a capacitor (102), a first switch (104) labelled S1, and a second switch (106) labelled S2. Capacitor (102) and switches (104, 106) may be constructed from discrete electronic devices, or as integrated circuit components. In FIG. 28A, the capacitor (102) is inserted into a series circuit by closing the first switch (104), and opening the second switch (106). Alternately, in FIG. 28B, the capacitor (102) is isolated from and bypassed in the same series circuit by opening the first switch (104), and closing the second switch (106). Such complementary operation of switches (104, 106) can be controlled by a controller (not shown) that is operatively connected to the switches to alternate the half-bridge (100) between these two states in a time period (e.g., fractions of a second) that is less than a time period required for charging of the capacitor (102). Half-bridge submodules, their construction, and their operation with controllers, are well known to persons of ordinary skill in the art.

"Full-bridge submodule" is as known in the art, and can also include circuit topologies that achieve substantially equivalent functionality (e.g., clamp-double submodules).

"Capacitor-based switching submodules", as used herein, refers to either HBSM and/or a full-bridge submodule or the like.

Circuit Topology of MMC AC-AC Converter.

In one aspect, the present invention comprises a modular multilevel AC-AC converter, and a power transfer mechanism for MMC based direct AC-AC power conversion. The AC-AC converter has a topology that includes a circulating current loop which facilitates average power shuttling between upper arms and lower arms in order to achieve charge balance of the internal capacitors (102) of sets of HBSMs (100) of the arms; in embodiments, the arms may further include other types of submodules, such as full-bridge submodules as discussed below. This capacitor power balancing process requires at least two different frequency components—i.e., a fundamental frequency AC component; and a DC component—in order to generate average power at one frequency while absorbing average power at the other frequency, so that the net steady-state average power absorbed by the capacitors is equal to zero. Therefore, given that the input and output currents of the converter are fundamental frequency AC, the circulating current of the converter includes a DC component. It will be understood that AC power may be at a variety of frequencies, and therefore the term "fundamental frequency AC" refers to a particular AC frequency of interest.

FIG. 1A illustrates the circuit topology of a first embodiment of a MMC AC-AC converter (10) of the present invention including a converter module. The converter module comprises two MMC phase legs, labelled as a "$1^{st}$ phase leg" and a "$2^{nd}$ phase leg" connected between an input terminal (12) and an output terminal (14).

Each phase leg has an upper arm and a lower arm, each of which have a set of half-bridge submodules connected in series together. Each phase leg has an upper set (16*a*; or 16*b*) comprising an integer number, $n_u$, greater than or equal to 1, of series-connected half-bridge submodules (100) (see FIG. 1B) in the upper arm, and a lower set (18*a*: or 18*b*) comprising an integer number, $n_l$, greater than or equal to one, of series-connected half-bridge submodules (100) (see FIG. 1B) in the lower arm. It will be understood that $n_u$ and $n_l$ may be either the same value or different values, within a phase leg. It will also be understood that each of $n_u$ and $n_l$ may be either the same value or different values, as between different phase legs. For the first phase leg, the upper arm and the lower arm are connected in series at a connection point (24). For the second phase leg, the upper arm and the lower arm are connected in series at a connection point (25).

$I_{circ}$ is the circulating current for capacitor charge balancing. The filter (20) (denoted DC Filter) at the output terminal (14) blocks DC currents while producing low impedance for the fundamental frequency currents passing to the output terminal (14). In this embodiment, the filter (20) comprises a first branch comprising a first capacitor (22) having a capacitance ($C_f$), and a second branch comprising a second capacitor (23) having a capacitance ($C_f$) and connected in series with the first capacitor (22). The first filter branch is connected in series with, and between the connection point (24) of the first phase leg, and the output terminal (14). The second filter branch is connected in series with, and between the connection point (25) of the second phase leg, and the output terminal (14). The + and − signs adjacent the capacitors (22; and 23) denote the assumed polarity of capacitor voltages. However, other embodiments of the filter (20) are possible, such as different passive filters that may incorporate inductors and/or resistors, or such as active filters comprising additional submodules, with half-bridge submodules being a non-limiting example of such submodules (see the embodiment of FIGS. 6B and 6C).

To understand the role of the filter (20) in the functioning of the converter (10*a*), it will be noted that when the converter (10*a*) is in use, a DC voltage is present between the upper and lower arms (e.g., at connection points (24 and 25) in FIG. 1A) of each phase leg. The existence of this DC voltage is a consequence of creating the DC power exchange needed between adjacent arms for capacitor charge balancing. The filter "blocks" this DC voltage, and thus prevents DC current from propagating to output terminal (14), which is connected to the AC output system (202) (see FIG. 3). The filter (20), however, must also pass fundamental frequency AC current. The use of two capacitors (22, 23) in the embodiment of FIG. 1A is one possible implementation of the filter (20) using passive components of capacitors (22, 23), but as noted above, the filter (20) may be implemented with other passive components (e.g., resistors and inductors) and active filter components (e.g., HBSMs as shown in FIGS. 6B and 6C). In this embodiment of FIG. 1A, the capacitor voltages as labelled, $V_{e1}$ and $V_{e2}$, will have a large positive DC component (imposed by the DC voltage existing between (24) and (25)) and also an AC component due to the AC current flowing through it, but $V_{e1}$ and $V_{e2}$ would remain positive valued during normal converter operation. Likewise, in the embodiment of FIGS. 6B and 6C, as described below, the voltages $V_{f1}$ and $V_{f2}$ would support positive voltages across them ($V_{f1}>0$ and $V_{f2}>0$). Active filter realization with submodules potentially has the ability to introduce operational advantages such as contributing to the overall output-to-input voltage level conversion of the converter.

As noted, each of the four arms comprise half-bridge submodules (HBSMs) (100). This is a low cost implementation. Other submodule types, collectively referred to herein as capacitor-based switching submodules (e.g., full-bridge, clamp-double submodule (CDSM)) could be deployed in the arms—in addition to, or in replacement of the HBSMs—to provide additional features, for instance, enhanced voltage injection capability or enhanced fault blocking capability. The diode symbols (arrow line intersected by transverse line) adjacent to the sets (16*a*, 16*b*, 18*a*, 18*b*) of HBSMs denote the orientation of the half-bridge submodules (100) within each arm. To elaborate, the sets (16*a*, 16*b*, 18*a*, 18*b*) of HBSMs (and hence the arms) either inject 0 Volts (i.e., when the constituent capacitor(s) are bypassed) or $+V_{csm}$ Volts (i.e., when the constituent capacitor(s) are inserted), and so only positive voltage can be injected by the arm. Importantly, however, the arms (and hence the half-bridge submodules) can carry both positive and negative currents. That is, $i_{u1}$ (and $i_{l1}$) in FIG. 1B can be positive or negative. Yet, the arm voltage has to remain positive (at least when using half-bridge submodules). The (+) and (−) labels on the sets (16*a*, 16*b*, 18*a*, 18*b*) of HBSMs show the polarity of positive voltage that can be injected by them. The diode symbols adjacent to the arms indicate the physical orientation of internal submodules (this is in reference to diodes connected in anti-parallel with individual transistors). Here, the sets (16*a* and 18*b*; or 16*b* and 18*b*) of HBSMs within the two arms of each phase leg are installed in opposing directions, which is unconventional.

The following will be noted regarding the circulating current loop or circuit loop (24) formed by the $1^{st}$ phase leg and the $2^{nd}$ phase leg. Within the first phase leg, the bottom ends (labelled (−) and indicating the negative point of assumed arm voltage polarity) of the HBSM chain (100) as illustrated in FIG. 1B are connected. This allows for average power shuttling between the upper arm and the lower arm, to achieve charge balance of the internal capacitors of these HBSMs: see the below discussion of inter-arm DC power exchange for capacitor charge balancing. Similarly, within the second phase leg, the top ends (labelled (+) and indicating the positive point of assumed arm voltage polarity) of the HBSM chain (100) as illustrated in FIG. 1B are connected. The top end (+) of the upper arm set (16*a*) of HBSMs of the first phase leg is connected to the bottom end (−) of the upper arm set (16*b*) of HBSMs of the second phase leg. The top end (+) of the lower arm set (18*a*) of HBSMs of the first phase leg is connected to the bottom end (−) of the lower arm set (18*b*) of HBSMs of the second phase leg.

FIG. 2 shows a simplified view of the converter (10*a*) of FIG. 1A highlighting the inter-arm DC power exchange for capacitor charge balancing, denoted by $P_\Delta$, between the upper and lower phase arms of each leg. The input and output AC quantities are related by the AC voltage step ratio $$G_v = \frac{\hat{V}_{aco}}{\hat{V}_{aci}}.$$

TABLE I

Idealized Arm Voltages and Currents for FIG. 1A

| | $G_V = 0.5$ | $G_V < 0.5$ | $G_V > 0.5$ |
|---|---|---|---|
| $V_{U1}$ | $(0.5 + 0.5\cos(\omega t))\hat{V}_{aci}$ | $[(1 - G_V) + (1 - G_V)\cos(\omega t)]\hat{V}_{aci}$ | $[G_V + (1 - G_V)\cos(\omega t)]\hat{V}_{aci}$ |
| $V_{L1}$ | $(0.5 - 0.5\cos(\omega t))\hat{V}_{aci}$ | $[(1 - G_V) + G_V\cos(\omega t)]\hat{V}_{aci}$ | $[G_V + G_V\cos(\omega t)]\hat{V}_{aci}$ |
| $i_{U1}$ | | $-I_{dc} + \frac{\hat{I}_{aci}}{2} \cdot \cos(\omega t + \theta_i)$ | |
| $i_{L1}$ | | $I_{dc} + \left(\frac{1 - G_v}{G_v}\right)\frac{\hat{I}_{aci}}{2} \cdot \cos(\omega t + \theta_i)$ | |

The ideal arm voltages and currents for the converter (10*a*) are given in Table I, assuming for simplicity of analysis that input and output AC voltage/current quantities are desired to be in phase (this assumption is also reflected in FIG. 2 with scalar $G_V$). However, $G_V$ may be complex valued to denote both magnitude and phase changes between input and output voltages (and currents). Internal AC voltage drops across the arm chokes are also assumed relatively small and thus neglected in Table I.

All the notations used in this analysis are referred to as the notations represented in FIG. 1A. In Table I, $\hat{V}_{aci}$ and $\hat{I}_{aci}$ are the fundamental frequency peak amplitudes of the input voltage and current. The arm voltages differ depending on the AC voltage step ratio $G_V$. If using half bridge submodules, the least possible DC voltage that an arm can possess is max $\{(1-G_V)\hat{V}_{aci}, G_V\hat{V}_{aci}\}$. If the DC voltage is below this value arm voltage becomes negative which is not possible to achieve with the half-bridge submodules (although, as discussed earlier, full-bridge submodules could be used to provide such negative voltage injection). For generalizing the analysis, let the DC voltage be defined as $V_{dc}$.

Figure 3:
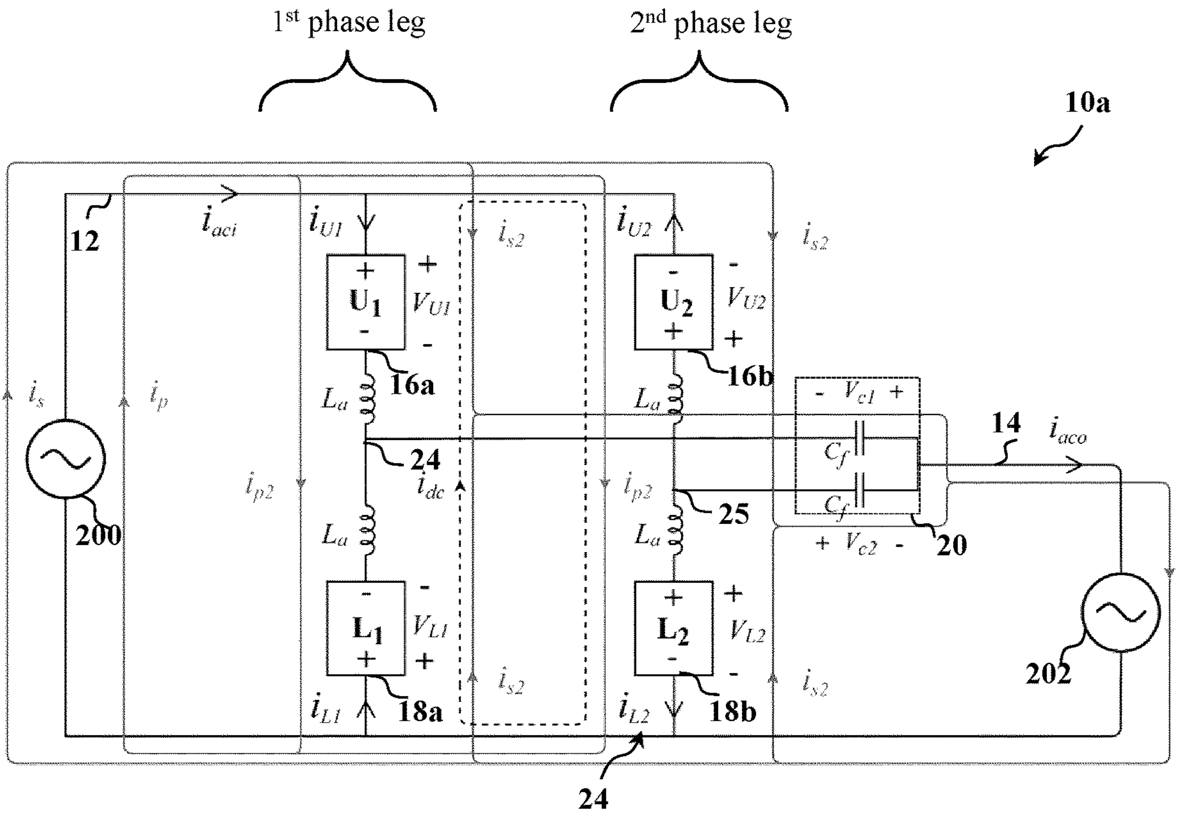
FIG. 3 shows a visualization of internal and input/output currents and voltages separately for the converter topology of FIG. 1A, when connected to AC voltage sources.

The arm currents and voltages represented in FIG. 1A can be mapped into new abstract variables as given in FIG. 3 to decouple internal and external quantities. FIG. 3 shows the converter (10*a*) connected to an input AC system (200) and an output AC system (202). In this application of the converter (10*a*), the input AC system (200) and the output AC system (202) are both voltage sources, as shown by the conventional symbol (wavy line within circle). In other applications of the converter (10*a*), the input AC system (200) and/or the output AC system (202) may be passive load(s), such that the input and/or output terminals (12;14) are not directly connected to an AC voltage source. Here, $U_1$ & $U_2$ (and $L_1$ & $L_2$) denote the upper (and lower) phase arms for legs 1 and 2. For simplicity of analysis and without loss of generality, it is assumed hereinafter that the arm chokes all have the same inductance value, e.g., $L_{ua}=L_{la}=L_a$ in FIG. 1A.

Here, $i_{dc}$ is the internal circulating current, and the current components $i_p$, $i_s$, $i_{p2}$ and $i_{s2}$ can be quantified as given in equations (1), (2), (3) and (4).

$$i_p = \left(1 - \frac{1}{2G_v}\right) i_{aci} \quad (1)$$

$$i_s = \frac{1}{2G_v} . i_{aci} \quad (2)$$

$$i_{p2} = \left(1 - \frac{1}{2G_v}\right) \frac{i_{aci}}{2} \quad (3)$$

$$I_{s2} = \frac{1}{4G_v} . i_{aci} \quad (4)$$

The input ($i_{aci}$) and output ($i_{aco}$) currents which are ideally fundamental AC currents, split evenly among the four arms and almost in phase with the corresponding voltages (resulting in average AC power absorption at each arm). Therefore, an AC power imbalance occurs between upper and lower arms which eventually deviates the half-bridge submodule capacitor voltages. To counteract the fundamental AC power imbalance, the DC circulating current can be controlled.

Figure 4:
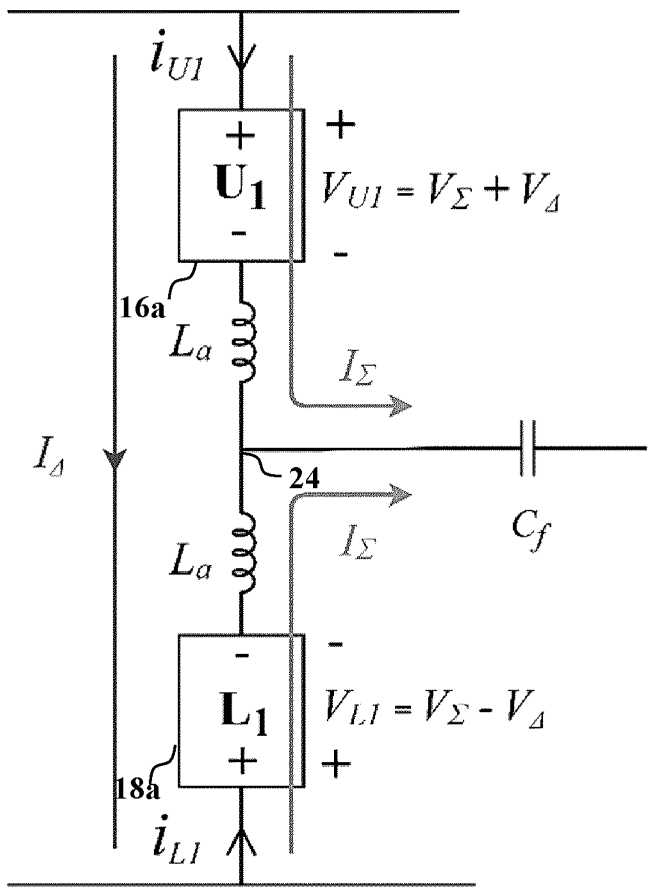
FIG. 4 shows currents and voltages in a time-averaged model in Σ-Δ domain for one phase leg of the converter topology of FIG. 1A.

In typical MMC analysis, arm currents and arm voltages are broken into common-mode components (terms common to each arm) and differential mode components (terms differential to each arm) [Reference no. 9]. The common-mode current $i_\Sigma$ carries one fourth of the output current and it is a purely fundamental frequency component. The differential mode current $i_\Delta$, carries the DC circulating current along with a fundamental component which depends on the conversion ratio ($G_v$). FIG. 4 illustrates the currents and voltages of the first leg in Σ-Δ coordination system. The voltage and current components are expressed in equations (5)-(8).

$$V_\Sigma = V_{dc} + (0.5 - G_V)\cos(\omega t)\hat{V}_{aci} \quad V_{dc} = \begin{cases} (1-G_V)\hat{V}_{aci} & G_V < 0.5 \\ G_V\hat{V}_{aci} & G_V > 0.5 \end{cases} \quad (5)$$

$$V_\Delta = 0.5\cos(\omega t)\hat{V}_{aci} \quad (6)$$

$$I_\Sigma = \frac{1}{4G_v} . \hat{I}_{ac} . \cos(\omega t + \theta_i) \quad (7)$$

$$I_\Delta = -I_{dc} + \left(1 - \frac{1}{2G_v}\right) \frac{\hat{I}_{ac} . \cos(\omega t + \theta_i)}{2} \quad (8)$$

Alternative Circuit Topologies of MMC AC-AC Converter

Figure 5:
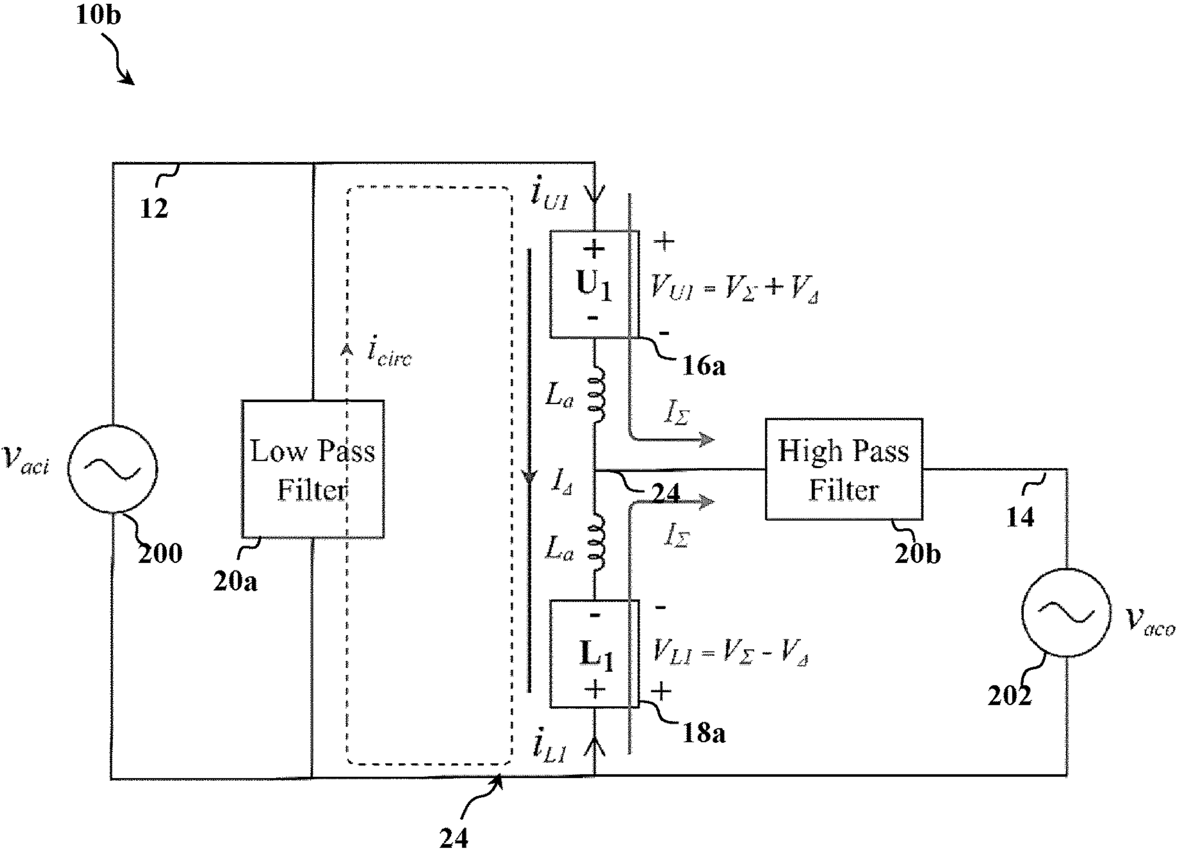
FIG. 5 shows a circuit topology for a second embodiment of a MMC AC-AC converter of the present invention having a single leg, when connected to AC voltage sources.

FIG. 5 shows a most generalized embodiment of a converter (10*b*) of the present invention, where only a single leg is utilized for AC-AC conversion. But as discussed previously, the leg should include a different frequency current component that should not interact with the input or output AC systems. Therefore, filters (20*a*; 20*b*) could be used at the input and output sides, respectively, to facilitate the flow of circulating current as shown in FIG. 5. Since the circulating current is DC, the input side filter (20*a*) may be a low pass filter (i.e., a filter that passes signals with a frequency lower than a cutoff frequency and attenuates signals with frequencies higher than the cutoff frequency) that provides a path for the DC current to flow, and the output side filter (20*b*) may be a high pass filter (i.e., a filter that passes signals with a frequency higher than the cutoff frequency and attenuates signals with frequencies lower than the cutoff frequency) that blocks DC and facilitates flow of fundamental frequency AC current.

In other embodiments, an inductive filter that provides a very high impedance for fundamental frequency current and zero impedance for DC current could be used as the input side filter (20*a*). However, it may result in bulky inductors at the input side.

Figure 6A:
FIG. 6A shows a circuit topology for a third embodiment of a MMC AC-AC converter of the present invention, with a capacitive output filter, when connected to AC voltage sources.
Figure 6A:
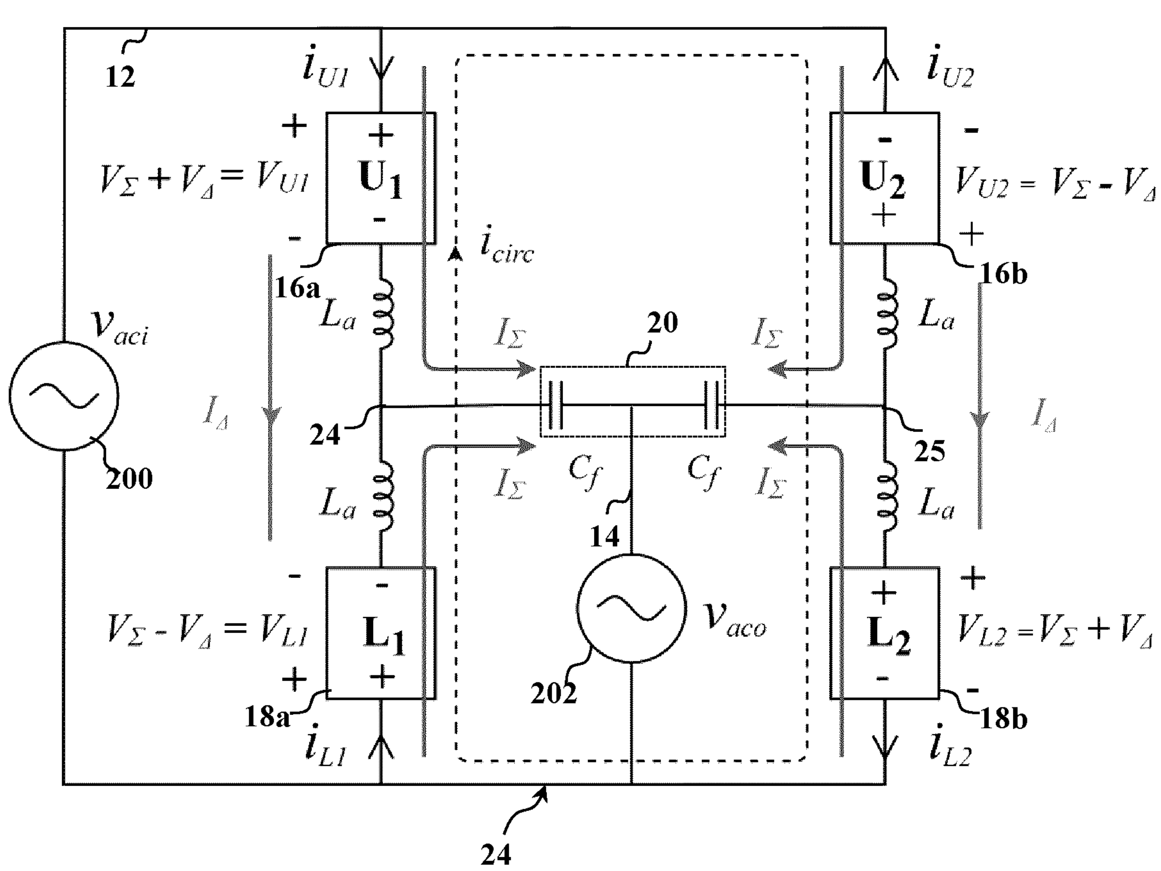
Figure 6B:
FIG. 6B shows a circuit topology for a fourth embodiment of an AC-AC converter of the present invention that uses additional sets of submodules (F1 and F2) for the output filter, when connected to AC voltage sources.
Figure 6B:
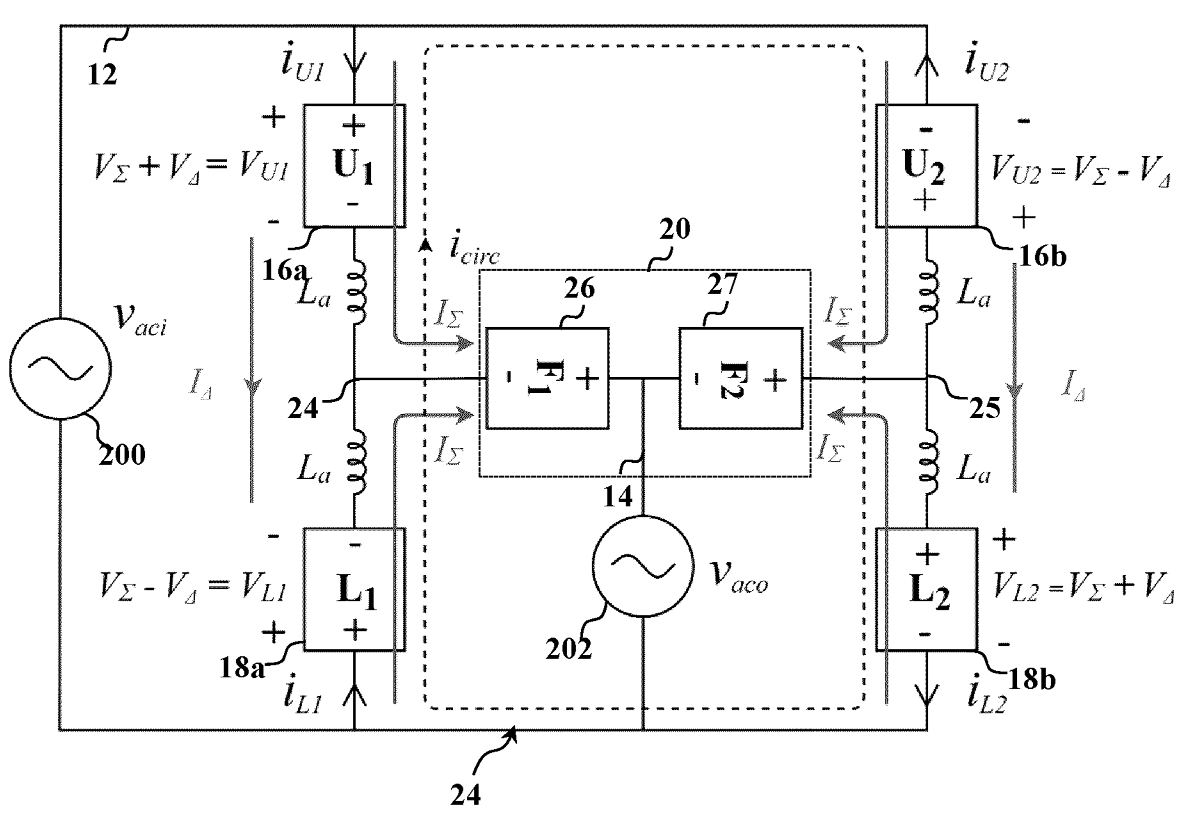
Figure 6C:
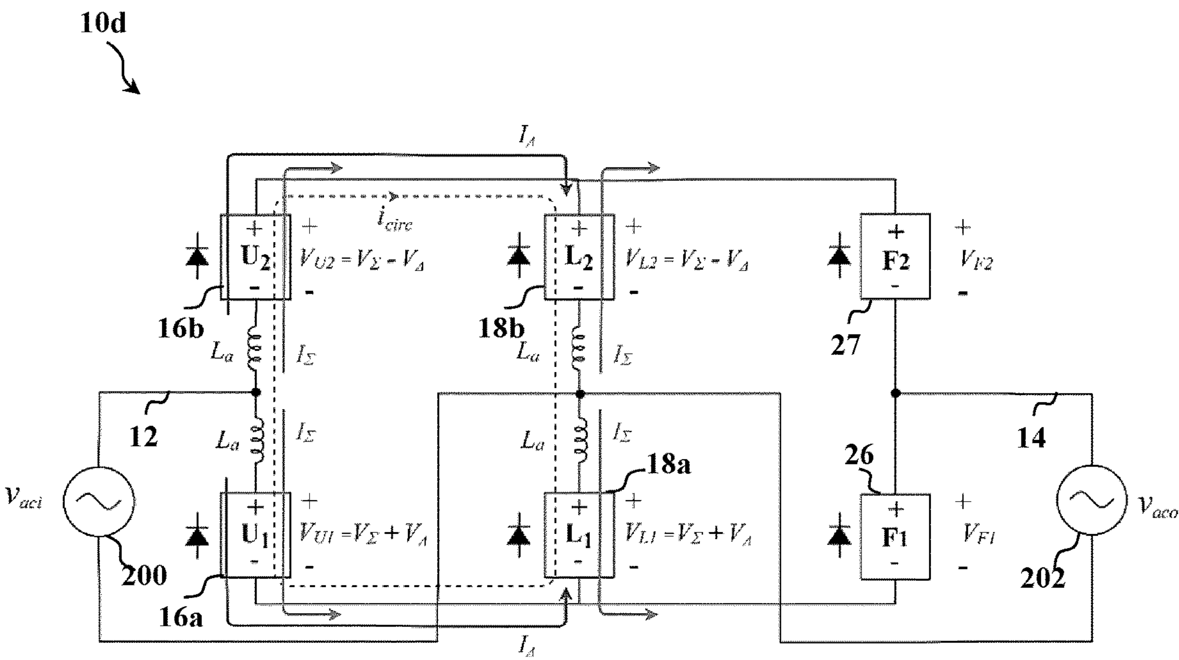
FIG. 6C shows a circuit topology for the MMC AC-AC converter of FIG. 6B when connected to AC voltage sources, redrawn such that the orientation of all phase arms are kept the same.

Instead, as shown in the topology another embodiment of the converter (10*c*) in FIG. 6A which is equivalent to the topology of FIG. 1A, a second phase leg comprising two arms may be utilized in place of the input side filter (20*a*). Further, this would double the power transfer throughput as both legs perform direct AC-AC conversion. At the output side, a capacitive filter (20) comprising a pair of capacitors can be used to block DC and pass fundamental frequency current.

Alternatively, in another embodiment of the converter (10*d*) as shown in FIG. 6B, a pair of sets (26;27) of half-bridge submodules (100) (analogous to the sets (16*a*; 16*b*; 18*a*; or 18*b*) of half-bridge submodules (100) shown in FIG. 1B) could be used as the output side filter (20), recognizing that sets (26, and 27) support positive voltage and bidirectional (i.e. both positive and negative) current. However, this requires increased semiconductor effort and control complexity. Additional submodules could also be used to implement the input and output side filters (20*a*; and 20*b*) in FIG. 5.

The phase arms and filter blocks in FIG. 6B are re-drawn in FIG. 6C to show an alternative but electrically equivalent representation of the converter (10*d*) of FIG. 6B. This alternative drawing keeps with conventional MMC practice where all phase arms are drawn with the same orientation (denoted by diode symbols in FIG. 6C). FIGS. 5 and 6A could be redrawn in a similar manner.

Arm Power Balancing.

The converter (10) must internally shuttle a fraction of AC average power in the form of DC power when transferring AC power from the input terminal (12) to the output terminal (14). This DC power processing is required to keep the charge balance of the arms' sets (16*a* and 18*a*; or 16*b* and 18*b*) of submodule capacitors. With the assumption of 100% efficiency, it can be claimed that the average power absorbed by the submodule capacitors within each arm is zero. Therefore, the steady state average power for the upper and lower arms of the first leg can be derived as in equations (9b) and (10b).

$$\langle P_u\rangle = \frac{1}{T}\int_0^T v_{U1} i_{U1}\,dt = \frac{1}{T}\int_0^T (v_\Sigma + v_\Delta)(i_\Sigma + i_\Delta)\,dt = 0$$

$$\langle P_u\rangle = \frac{1}{T}\int_0^T \left(V_{dc} + (1-G_V)\cos(\omega t)\hat{V}_{aci}\right) * \left(-I_{dc} + \frac{\hat{I}_{aci}}{2}.\cos(\omega t + \theta_i)\right)dt$$

$$\langle P_u\rangle = \frac{1}{T}\int_0^T \left(-V_{dc}.I_{dc} + V_{dc}\frac{\hat{I}_{aci}}{2}.\cos(\omega t + \theta_i) - I_{dc}(1-G_V)\cos(\omega t)\hat{V}_{aci} + (1-G_V)\cos(\omega t)\hat{V}_{aci}\frac{\hat{I}_{aci}}{2}.\cos(\omega t + \theta_i)\right)dt$$

Since the integration of cos(ωt) over a fundamental frequency cycle, is zero:

$$\langle P_u\rangle = \frac{-V_{dc}.I_{dc}}{T}\int_0^T dt + (1-G_V)\hat{V}_{aci}.\frac{\hat{I}_{aci}}{2}.\frac{1}{T}\int_0^T\left(\frac{\cos(\theta_i)}{2}\right)dt \tag{9a}$$

$$\langle P_u\rangle = -V_{dc}.I_{dc} + (1-G_V)\frac{\hat{V}_{aci}.\hat{I}_{aci}}{2}.\frac{\cos(\theta_i)}{2}$$

Here, $\hat{V}_{aci} \cdot I_{aci}\cos(\theta_i)/2$ can be defined as average AC power ($P_{ac}$) and $V_{dc} \cdot I_{dc}$ as the DC power ($P_{dc}$). Therefore, equation (9a) can be rearranged as equation (9b) and $P_{ac}/2$ is equal to the AC power processed by each leg. That is, $P_{ac}$ is the total average AC power input to the converter that comprises two phase legs.

$$\langle P_u\rangle = -P_{dc} + (1-G_V)\frac{P_{ac}}{2} = 0 \tag{9b}$$

Similarly, for the lower arm power balance can be written as equation (10a) which yields the power balance criteria of equation (10b);

$$\langle P_l\rangle = \frac{1}{T}\int_0^T v_{L1} i_{L1}\,dt = \frac{1}{T}\int_0^T (v_\Sigma - v_\Delta)(i_\Sigma - i_\Delta)\,dt = 0 \tag{10a}$$

$$\langle P_l\rangle = \frac{1}{T}\int_0^T \left(V_{dc} - G_V\cos(\omega t)\hat{V}_{aci}\right) * \left(I_{dc} + \left(\frac{1-G_v}{G_v}\right)\frac{\hat{I}_{aci}}{2}.\cos(\omega t + \theta_i)\right)dt$$

$$\langle P_l\rangle = \frac{1}{T}\int_0^T \left(V_{dc}.I_{dc} + V_{dci}.\left(\frac{1-G_v}{G_v}\right).\frac{\hat{I}_{aci}}{2}.\cos(\omega t + \theta_i) + I_{dc}(-G_V)\cos(\omega t)\hat{V}_{aci} - G_V\cos(\omega t)\hat{V}_{aci}.\left(\frac{1-G_v}{G_v}\right).\frac{\hat{I}_{aci}}{2}.\cos(\omega t + \theta_i)\right)dt$$

$$\langle P_l\rangle = V_{dc}.I_{dc} - (1-G_V)\frac{\hat{V}_{aci}.\hat{I}_{aci}}{2}.\frac{\cos(\theta_i)}{2} = 0$$

-continued $$\langle P_l\rangle = P_{dc} - (1-G_V)\frac{P_{ac}}{2} = 0 \tag{10b}$$

Therefore, according to equations (9b) and (10b), the upper and lower arms should exchange a DC power equal to $(1-G_V)P_{ac}/2$. Further, it is differential mode, i.e., $P_\Delta=(1-G_V)P_{ac}/2$ (refer to FIG. 2).

When the power factor is assumed to be unity, the required DC current normalized to the AC current peak can be derived as equation (11).

$$\frac{I_{dc}}{\hat{I}_{aci}} = \frac{(1-G_V)}{2}.\frac{\hat{V}_{aci}}{V_{dc}} \tag{11}$$

According to equation (11), the per-unit (pu) DC current stress can be minimized by maximizing the DC voltage $V_{dc}$. For $G_V<0.5$, $V_{dc}$ can be selected as $(1-G_V)\hat{V}_{aci}$ and that would yield 0.5 pu DC current. However, in $G_V>0.5$, $V_{dc}$ can be set to $G_V\hat{V}_{aci}$ which makes the required pu DC current $0.5(G_V^{-1}-1)$. Therefore, when the conversion ratio is above 0.5 the DC current stress on arms also reduces with $G_V$.

The submodule capacitor voltage also directly depends on the conversion ratio $G_V$. When $G_V<0.5$ both arms should support a DC voltage of $(1-G_V)\hat{V}_{aci}$. Further, the upper arm should support an AC voltage of $(1-G_V)\hat{V}_{aci}$ which makes the total voltage it should possess equals to $2(1-G_V)\hat{V}_{aci}$. For the lower arm, the AC voltage is $G_V\hat{V}_{aci}$ and the total capacitor voltage becomes $\hat{V}_{aci}$.

Figure 7:
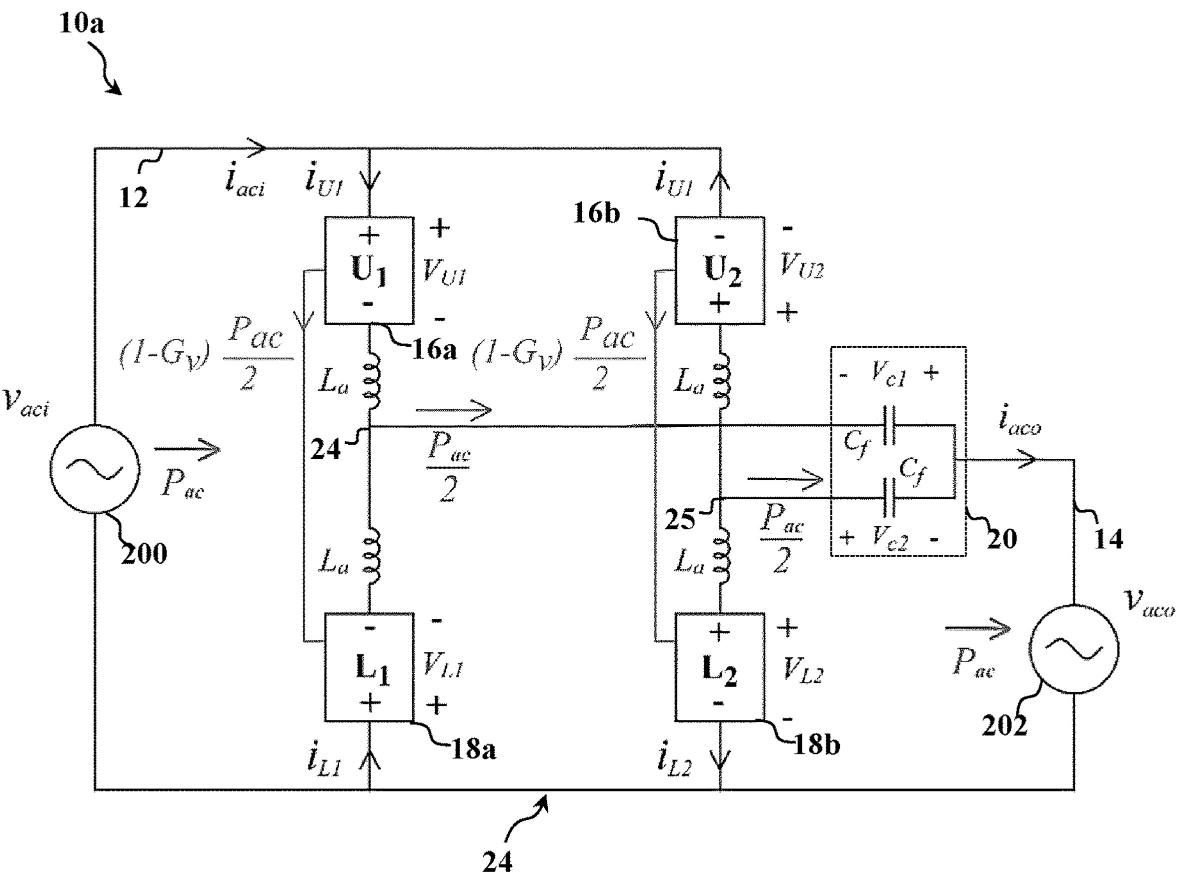
FIG. 7 shows an illustration of input/output power transfer and internal power processing for the converter topology of FIG. 1A.

As shown in FIG. 7 for the topology of converter (10*a*) of FIG. 1A, when $G_V>0.5$ both arms should support a DC voltage of $G_V V_{aci}$. Further, the upper arm should support an AC voltage of $(1-G_V)V_{aci}$ which makes the total voltage it should possess equal to $V_{aci}$. For the lower arm, the AC voltage is $(1-G_V)V_{aci}$ and the total capacitor voltage becomes $2(1-G_V)V_{aci}$.

Converter Operation with Both Magnitude and Phase Change.

The proposed converter (10) is also capable of providing voltage phase shift at the output relative to the input. For that case, the output-to-input voltage ratio becomes complex valued. Therefore, if the input voltage is $\hat{V}_{aci}\cos(\omega t)$, and the output becomes $\hat{V}_{aco}\cos(\omega t+\theta_{Gv})$, this implies a complex voltage ratio $$\overline{G_v} = \frac{\hat{V}_{aco}}{\hat{V}_{aci}}\angle\theta_{Gv}.$$

Here the bar notation denotes phasor quantities.

For the condition where a voltage phase change between input and output is accounted for, and assuming the arm average power analysis is redone (e.g., see earlier equations (9b) and (10b)), the upper and lower arms should exchange a DC power equal to $(1-G_v\cos(\theta_{Gv}))P_{ac}/2$.

Dynamic Modelling.

Figure 8:
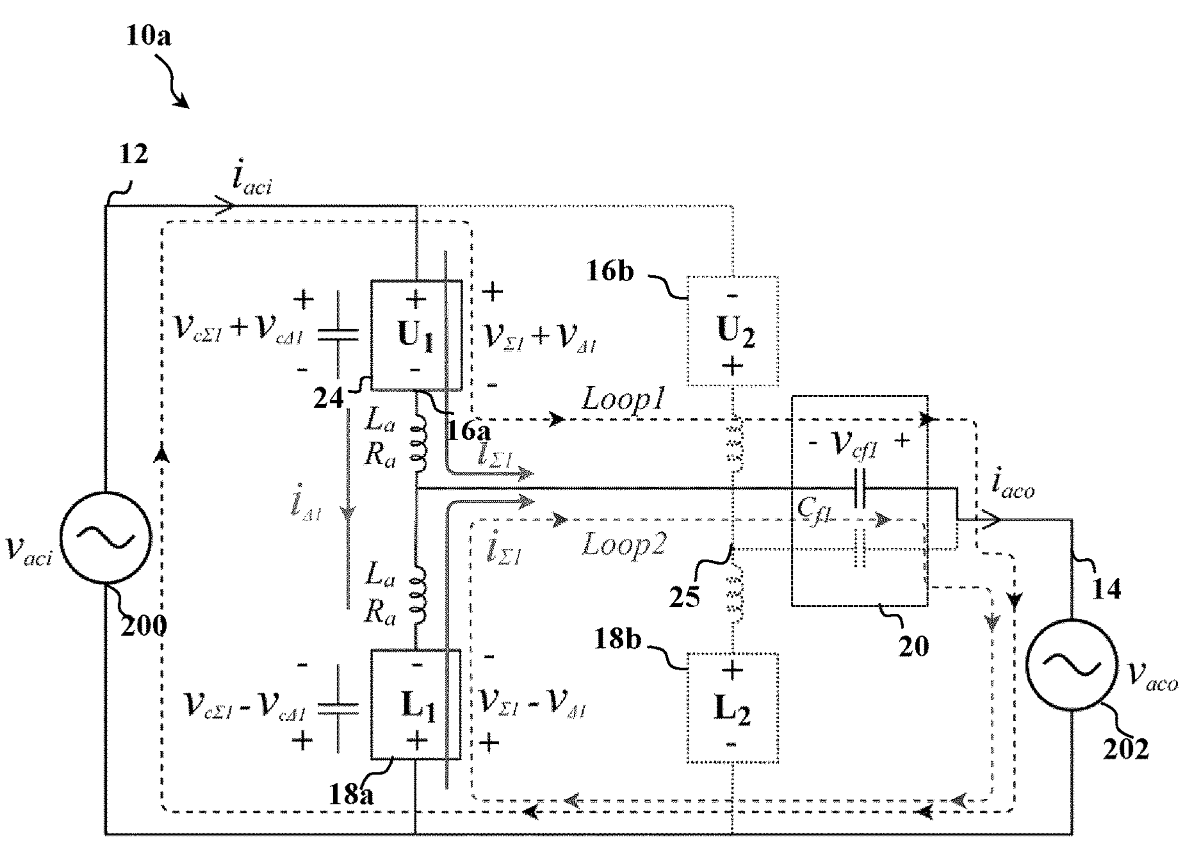
FIG. 8 shows a considered voltage loops and parameters to derive the dynamic equations for the converter topology of FIG. 1A.

In order to observe the dynamic behavior of the converter (10*a*) of FIG. 1A, the first leg was considered along with two current loops that include the upper arm and the lower arms separately as depicted in FIG. 8. Applying Kirchoff's voltage low (KVL) to the loop 1 yields equation (12), and to loop 2 yields equation (13). Here, $R_a$ is the internal resistance of arm inductors and $L_a$ is the inductance.

$$v_{aci}-(v_{\Sigma1}+v_{\Delta1})-L_a\frac{d}{dt}(i_{\Sigma1}-i_{\Delta1})-R_a(i_{\Sigma1}-i_{\Delta1})+v_{cf1}-v_{aco}=0 \quad (12)$$

$$-(v_{\Sigma1}-v_{\Delta1})-L_a\frac{d}{dt}(i_{\Sigma1}-i_{\Delta1})-R_a(i_{\Sigma1}+i_{\Delta1})+v_{cf1}-v_{aco}=0 \quad (13)$$

A common approach to mathematical modeling of MMC circuits is to decouple the internal dynamics into common-mode dynamics and differential-mode dynamics [Reference no. 10]. Adding and subtracting the equations (12) and (13) bring forth the common mode and differential mode dynamics as expressed in equations (14) and (15). The dynamic equations can be written in the Laplace domain as in equations (16) and (17).

(12) + (13)

$$v_{aci}-2v_{\Sigma1}-2L_a\frac{d}{dt}i_{\Sigma1}-2R_ai_{\Sigma1}+2v_{cf1}-2v_{aco}=0 \quad (14)$$

$$L_a\frac{d}{dt}i_{\Sigma1}+R_ai_{\Sigma1}=\frac{v_{aci}}{2}-v_{\Sigma1}+v_{cf1}-v_{aco}$$

(12) − (13)

$$v_{aci}-2v_{\Delta a}-2L_a\frac{d}{dt}(i_{\Delta1})-2R_a(i_{\Delta1})=0 \quad (15)$$

$$L_a\frac{d}{dt}(i_{\Delta1})+R_a(i_{\Delta1})=\frac{v_{aci}}{2}-v_{\Delta1}$$

In Laplace domain;

$$L_asI_{\Sigma1}(s)+R_aI_{\Sigma1}(s)=\frac{V_{aci}(s)}{2}-V_{\Sigma1}(s)+V_{cf1}(s)-V_{aco}(s) \quad (16)$$

$$L_asI_{\Delta1}(s)+R_aI_{\Delta1}(s)=\frac{V_{aci}(s)}{2}-V_{\Delta1}(s) \quad (17)$$

Filter Capacitor Dynamics are obtained by applying Kirchoff's current low (KCL) to the filter capacitors as;

$$C_{f1}\frac{d}{dt}(v_{cf1})=2i_{\Sigma1} \quad (18)$$

$$C_{f1}sV_{cf1}(s)=2I_{\Sigma1}(s)$$

Then, the submodule capacitor dynamic relationship with arm currents can be derived as equations (19a) and (19b), considering time-averaged quantities. Here, $m_{\Sigma1}$ and $m_{\Delta1}$ are the common mode and differential mode modulation signals.

$$\frac{C_{sm}}{n_u}\cdot\frac{d}{dt}(v_{c\Sigma1}+v_{c\Delta1})=(m_{\Sigma1}+m_{\Delta1})(i_{\Sigma1}-i_{\Delta1}) \quad (19a)$$

$$\frac{C_{sm}}{n_l}\cdot\frac{d}{dt}(v_{c\Sigma1}-v_{c\Delta1})=(m_{\Sigma1}-m_{\Delta1})(i_{\Sigma1}+i_{\Delta1}) \quad (19b)$$

These dynamic equations can be put into state space form as follows $$C_{sm}\cdot\begin{bmatrix}1/n_u & 1/n_u\\ 1/n_l & -1/n_l\end{bmatrix}\cdot\frac{d}{dt}\begin{bmatrix}v_{c\Sigma1}\\ v_{c\Delta1}\end{bmatrix}=\begin{bmatrix}(m_{\Sigma1}+m_{\Delta1}) & -(m_{\Sigma1}+m_{\Delta1})\\ (m_{\Sigma1}-m_{\Delta1}) & (m_{\Sigma1}-m_{\Delta1})\end{bmatrix}\begin{bmatrix}i_{\Sigma1}\\ i_{\Delta1}\end{bmatrix} \quad (19c)$$

$$\frac{d}{dt}\begin{bmatrix}v_{c\Sigma1}\\ v_{c\Delta1}\end{bmatrix}=\frac{1}{C_{sm}}\cdot\begin{bmatrix}1/n_u & 1/n_u\\ 1/n_l & -1/n_l\end{bmatrix}^{-1}\cdot\begin{bmatrix}(m_{\Sigma1}+m_{\Delta1}) & -(m_{\Sigma1}+m_{\Delta1})\\ (m_{\Sigma1}-m_{\Delta1}) & (m_{\Sigma1}-m_{\Delta1})\end{bmatrix}\begin{bmatrix}i_{\Sigma1}\\ i_{\Delta1}\end{bmatrix}$$

-continued $$\frac{d}{dt}\begin{bmatrix}v_{c\Sigma1}\\ v_{\Delta1}\end{bmatrix}=\frac{1}{C_{sm}}\begin{bmatrix}n_u/2 & n_u/2\\ n_l/2 & -n_l/2\end{bmatrix}\cdot\begin{bmatrix}(m_{\Sigma1}+m_{\Delta1}) & -(m_{\Sigma1}+m_{\Delta}1)\\ (m_{\Sigma1}-m_{\Delta1}) & (m_{\Sigma1}-m_{\Delta1})\end{bmatrix}\begin{bmatrix}i_{\Sigma1}\\ i_{\Delta1}\end{bmatrix}$$

Finally, the state space model (non-linear) governing the time-averaged dynamics of the first M2AC phase leg in FIG. 8 is:

$$\frac{d}{dt}\begin{bmatrix}i_{\Sigma1}\\ i_{\Delta1}\\ v_{v C\Sigma1}\\ v_{C\Delta1}\\ v_{cf1}\end{bmatrix}=A.\begin{bmatrix}i_{\Sigma1}\\ i_{\Delta1}\\ v_{C\Sigma1}\\ v_{C\Delta1}\\ v_{cf1}\end{bmatrix}+B.\begin{bmatrix}v_{aci}\\ v_{aco}\end{bmatrix}$$

where $$A=\begin{bmatrix}-R_a/L_a & 0 & -m_{\Sigma1}/L_a & -m_{\Delta1}/L_a & 1/L_a\\ 0 & -R_a/L_a & m_{\Delta1}/L_a & m_{\Sigma1}/L_a & 0\\ n_um_{\Sigma1}/C_{sm} & -n_um_{\Delta1}/C_{sm} & 0 & 0 & 0\\ n_um_{\Delta1}/C_{sm} & -n_um_{\Sigma1}/C_{sm} & 0 & 0 & 0\\ 2/C_{f1} & 0 & 0 & 0 & 0\\ 2/C_{f1} & 0 & 0 & 0 & 0\end{bmatrix}$$

$$B=\begin{bmatrix}1/2 & -1\\ -1/2 & 0\\ 0 & 0\\ 0 & 0\\ 0 & 0\end{bmatrix}$$

A similar set of differential equations could be derived for the time-averaged dynamics of the second phase leg of the converter (10*a*) in FIG. 8.

Controller Design.

Based on the dynamic behavior intuition gained in the modeling, a dynamic control scheme is provided to regulate the output power and internal currents. Regulating the output power is the main control objective of many high voltage converters which is achieved through regulating the output currents. The general approach for MMC converters is controlling common mode and differential mode parameters independently which creates room for controlling common mode and differential mode parameters independently. As shown schematically in the embodiment of FIGS. 13A to 13D, the role of the controller (200) is to output modulating signals, that are transmitted to a converter (10) of the present invention to control it. The controller described herein is only one example of how the converter can be controlled based on regulation of the output current. Other dynamic controller methodologies may be preferred depending on the application, for example, the direct regulation of output voltage. It will be further understood that the controllers described below can be used alone, or in any combination or sub-combination.

1. Output Current Controller (Common Mode Controller).

Figure 9:
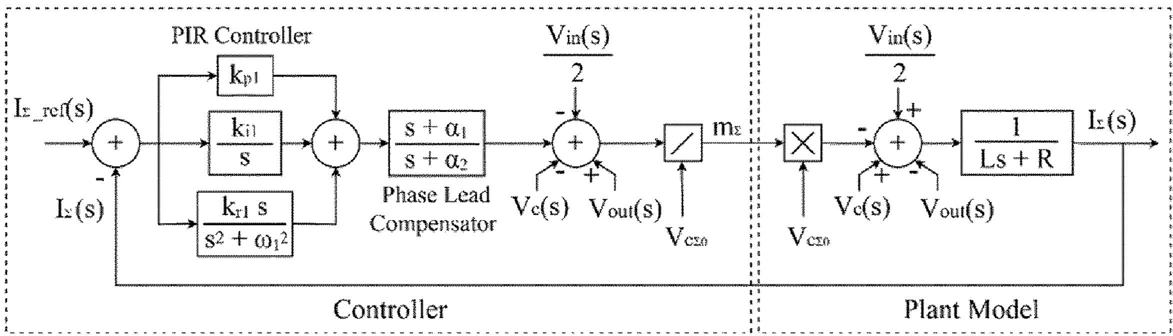
FIG. 9 shows an embodiment of a common mode current controller of the present invention, with a plant model (to regulate output power), for use with an MMC AC-AC converter of the present invention.
Figure 10:
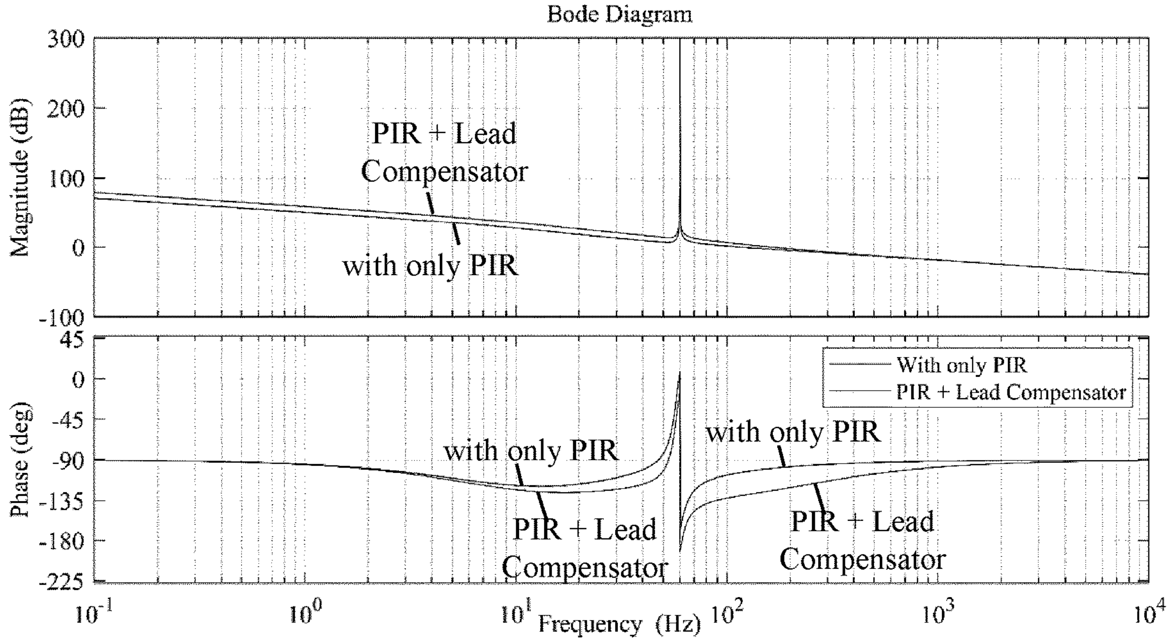
FIG. 10 shows a Bode plot of the loop gain of the common mode current controller of FIG. 9.

The common mode current controller with controls the fundamental AC current is needed to regulate the converter's output current which ultimately regulates the output power flow. According to the dynamic equations of common mode current the open loop transfer function of the system was $1/(L_as+R_a)$. In order to achieve a robust current control performance, a proportional-integral-resonant (PIR) regulator which tracks AC references in the stationary frame with zero steady state error, was incorporated. A phase lead compensator was also included to achieve better phase margin maintenance. The closed loop controller along with a plant model for common mode current controlling, is presented in an embodiment in FIG. 9. $V_{C\Sigma 0}$ is the average capacitor voltage (can be set to $\hat{V}_{aci}$). The disturbances are also decoupled by the means of feed forward controls. The current reference was calculated based on the power demand of the connected load. The control gains calculated for the simulations are presented in Table II and the loop gain bode plot is presented in FIG. 10.

TABLE II

| Control Parameters for common mode current controller | |
|---|---|
| Parameter | Values |
| PIR Controller | |
| Proportional Gain ($K_{p1}$) | 21.6719 |
| Integral Gain ($K_{i1}$) | 3268.04 |
| Resonant Gain ($K_{r1}$) | 1309.3 |
| Resonant Frequency ($\omega_1$) | 376.99 |
| Lead Compensator | |
| Zero ($\alpha_1$) | 1207 |
| Pole ($\alpha_2$) | 471.1 |

2. Circulating Current Suppression Controller.

Figure 11:
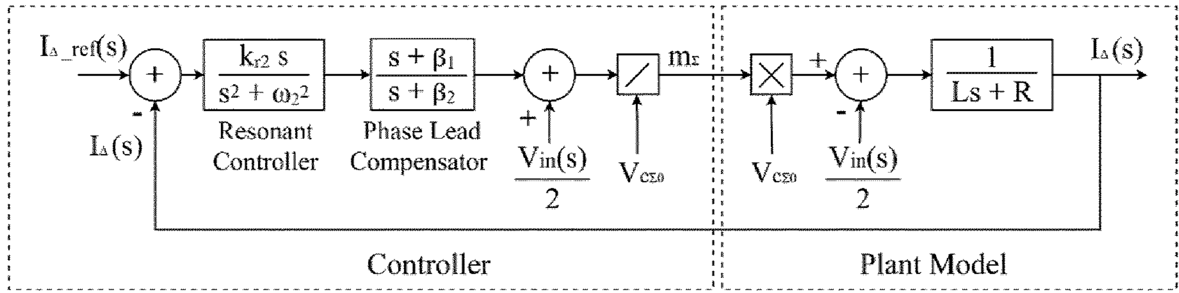
FIG. 11 shows an embodiment of a circulating current suppression controller of the present invention, with a plant model (for second harmonic), for use with an AC-AC converter of the present invention.
Figure 12:
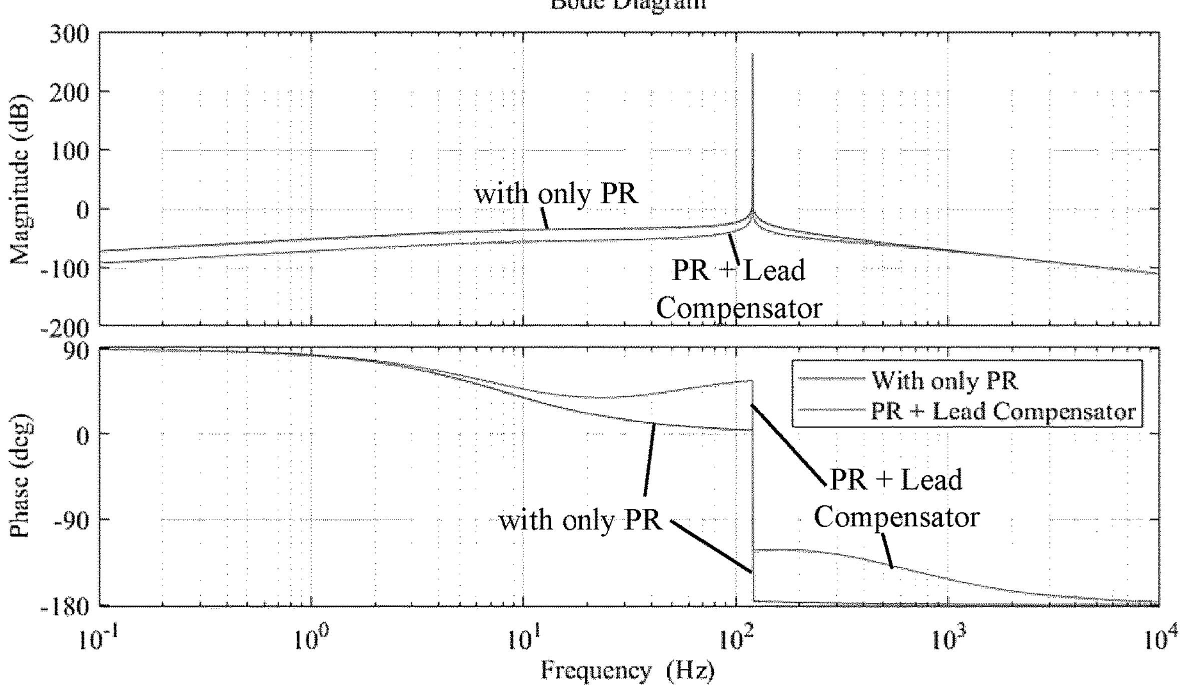
FIG. 12 shows a Bode plot of the loop gain of the circulating current suppression controller of FIG. 11.

In this converter topology of the present invention, the internal circulating DC current plays a major role by maintaining the arm energy balance. However, one of the issues that arise in many MMC topologies is the higher order harmonic currents which circulate internally. Especially the arise of second harmonic circulating current is common when the converter is associated with a fundamental AC frequency. However, these currents do not affect the output current as they do not leave the converter arms. Circulating currents, however, increase the arm current and may lead to excessive losses and large capacitor voltage ripple. Therefore, a second harmonic suppression controller (CCSC) was developed to suppress the unwanted circulating current. The dynamic equations of differential mode, i.e. equation (15) were used to develop a proportional-resonant (PR) regulator and the disturbances are decoupled with the means of feed forward control. The control reference was set to be zero. An embodiment of a controller along with the plant model is presented in FIG. 11. The controller parameters calculated for the simulation ratings are expressed in Table III and loop gain bode plot is shown in FIG. 12.

TABLE III

| Control Parameters for circulating current second harmonic suppression controller | |
|---|---|
| Parameter | Values |
| PR Controller | |
| Resonant Gain (Kr2) | 2199 |
| Resonant Frequency (ω2) | 753.98 |
| Lead Compensator | |
| Zero (β1) | 314.7 |
| Pole (β 2) | 1834 |

3. Voltage Balancing Controllers.

Submodule capacitor voltage controlling was achieved through manipulating the different frequency components of $I_\Delta$. The common mode voltage ($V_{C\Sigma}$) was regulated by controlling the fundamental AC current of $I_\Delta$ and differential voltage ($V_{C\Delta}$) was controlled through the DC current of $I_\Delta$. Therefore, the differential mode current dynamics expressed in (15) was used for designing the inner control loops for both the voltage controllers (i.e. $V_{C\Sigma}$ and $V_{C\Delta}$ controllers). The voltage reference $V_{C\Sigma\_ref}$ depends on the input voltage (minimum should be $\hat{V}_{aci}$ to avoid overmodulation).

Figure 13:
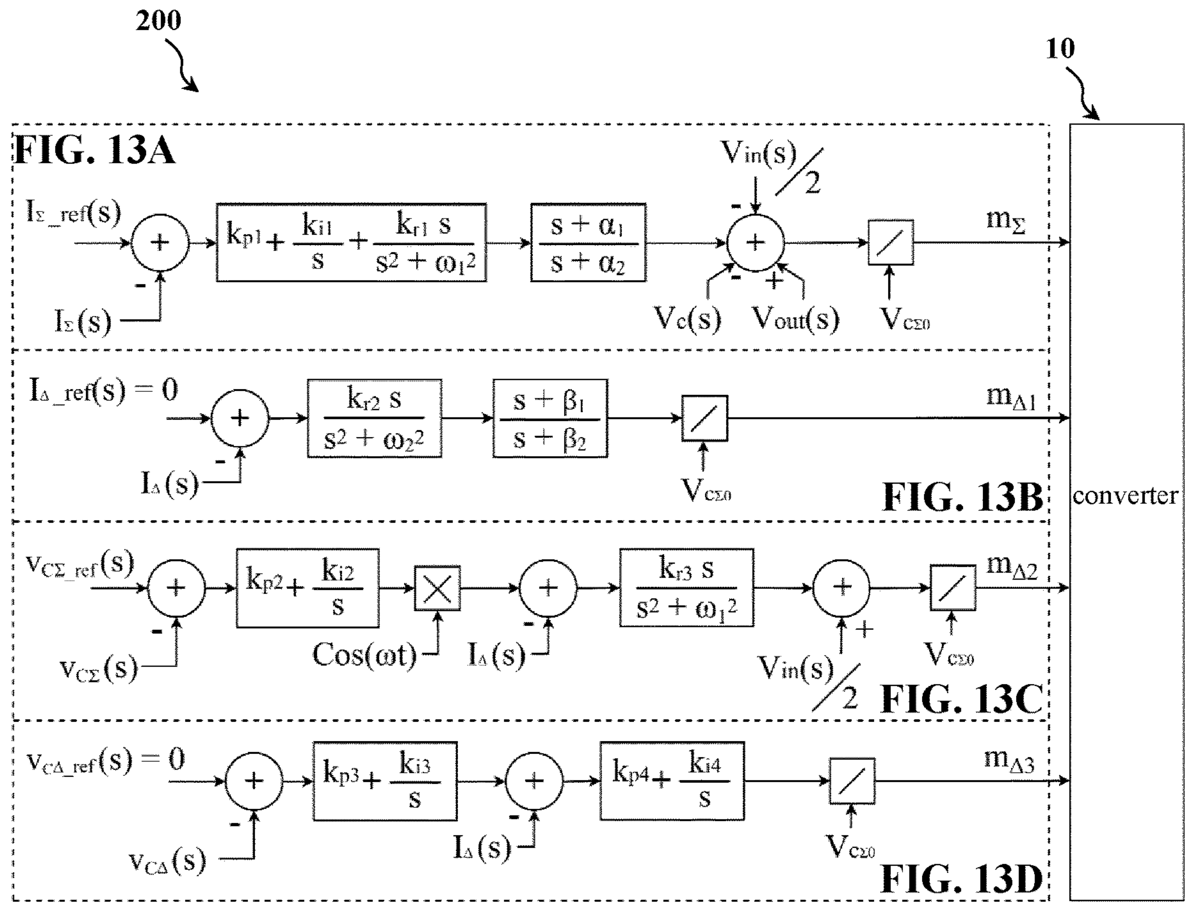
FIGS. 13A to 13D show embodiments of dynamic controllers of the present invention, for use with an AC-AC converter of the present invention.

For $V_{C\Sigma}$ controlling, a resonant controller was used on the inner current loop to regulate the fundamental AC current along with a proportion integral (PI) controller on the voltage loop. For $V_{C\Delta}$ controlling two PI controllers were used in the inner current loop and outer voltage loop. The bandwidth of each controller was chosen such that the other controllers are unaffected. The same loop shaping method was used to tune the gains. The control gains of $V_{C\Sigma}$ controller and $V_{C\Delta}$ controller used in simulations are presented in Table IV and Table V. The full dynamic controller structure is shown in FIGS. 13A to 13D, with FIG. 13A showing an embodiment of a common mode current controller, FIG. 13B showing an embodiment of a second harmonic current suppression controller, FIG. 13C showing an embodiment of a common mode capacitor voltage controller, and FIG. 13D showing a differential mode capacitor voltage controller.

TABLE IV

| Control Parameters for $V_{C\Sigma}$ controlling | |
|---|---|
| Parameter | Values |
| Inner Current control loop | |
| Resonant Gain (Kr3) | 1258.9 |
| Resonant Frequency (ω1) | 376.9911 |
| Outer Voltage control loop | |
| Proportional Gain (Kp2) | 1.4 |
| Integral Gain (Ki2) | 12.3 |

TABLE V

| Control Parameters for $V_{C\Delta}$ controlling | |
|---|---|
| Parameter | Values |
| Inner Current control loop | |
| Proportional Gain (Kp4) | 3.87 |
| Integral Gain (Ki4) | 43.7 |
| Outer Voltage control loop | |
| Proportional Gain (Kp3) | 1.8 |
| Integral Gain (Ki3) | 6.23 |

Simulation Verification and Results.

Figure 14A:
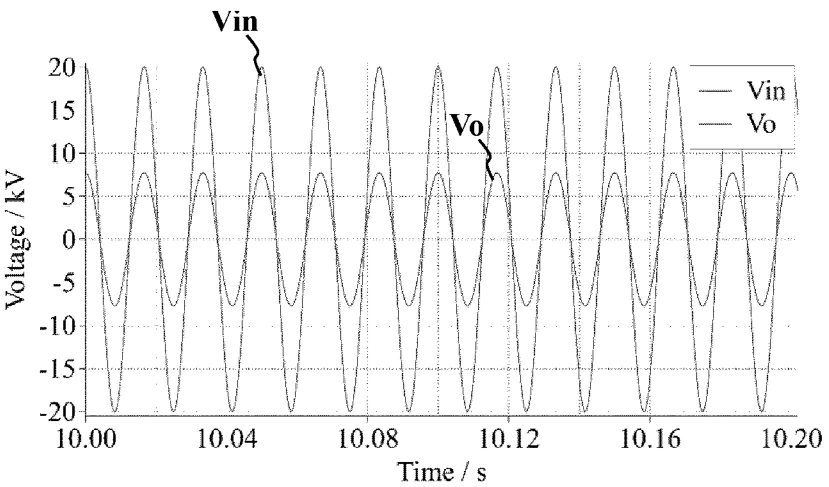
FIGS. 14A to 14B show simulation results of input and output voltages for the converter topology of FIG. 1A at $G_V$=0.4 (FIG. 14A), 0.5 (FIG. 14B) and 0.6 (FIG. 14C).
Figure 14B:
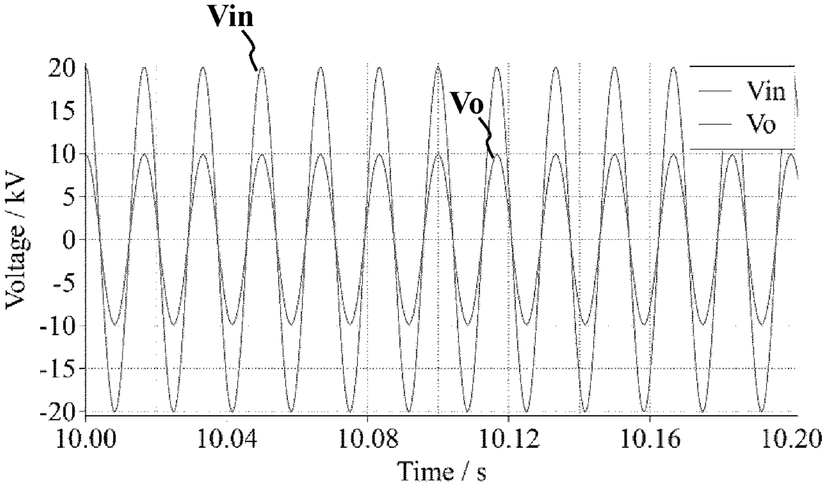
Figure 14C:
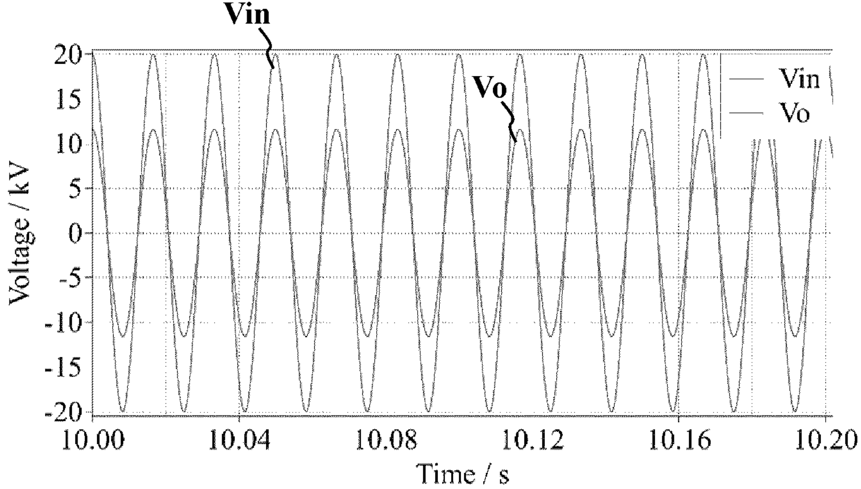
Figure 15A:
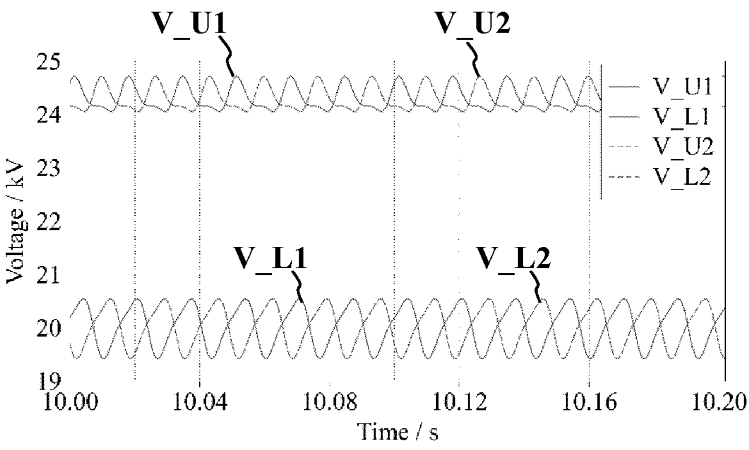
FIGS. 15A to 15C show simulation results of sum capacitor voltages of each arm for the converter topology of FIG. 1A at $G_V$=0.4 (FIG. 15A), 0.5 (FIG. 15B) and 0.6 (FIG. 15C).
Figure 15B:
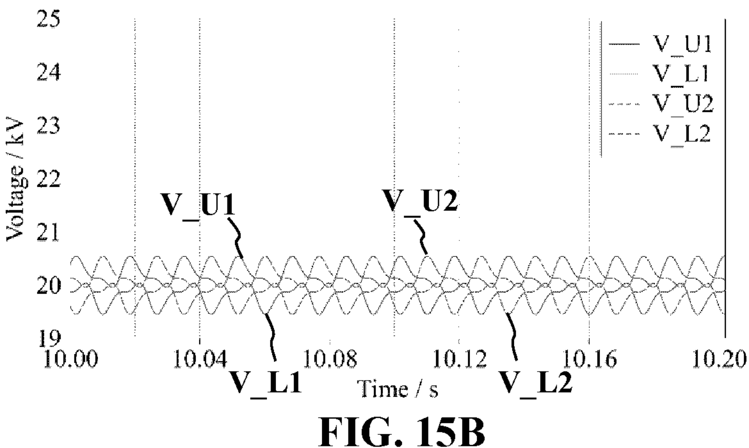
Figure 15C:
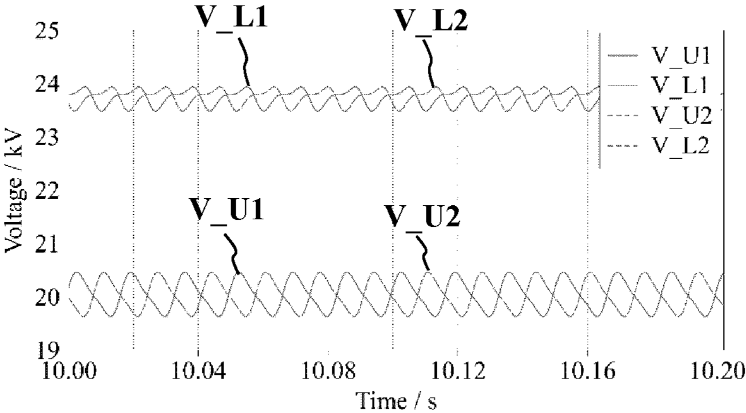
Figure 16A:
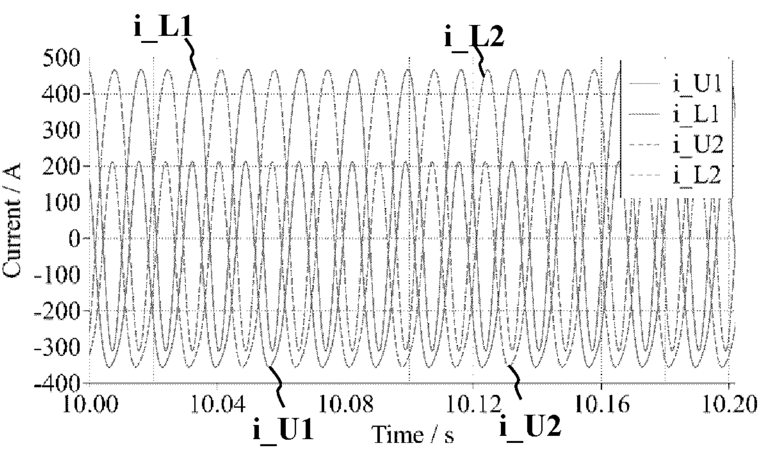
FIGS. 16A to 16C show simulation results of arm currents for the converter topology of FIG. 1A at $G_V$=0.4 (FIG. 16A), 0.5 (FIG. 16B) and 0.6 (FIG. 16C).
Figure 16B:
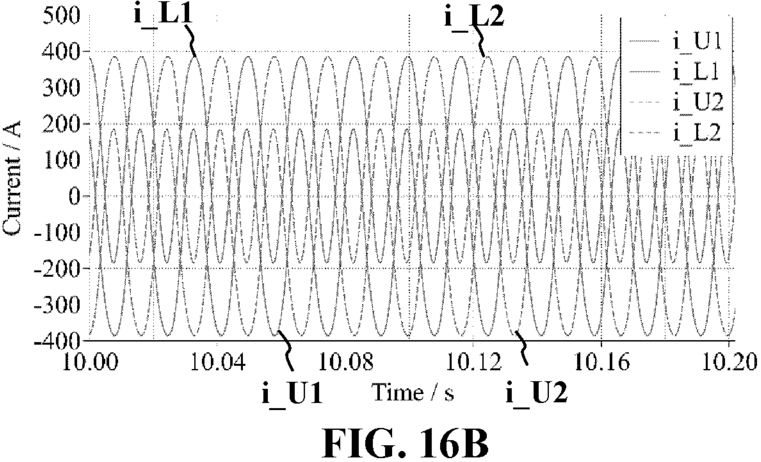
Figure 16C:
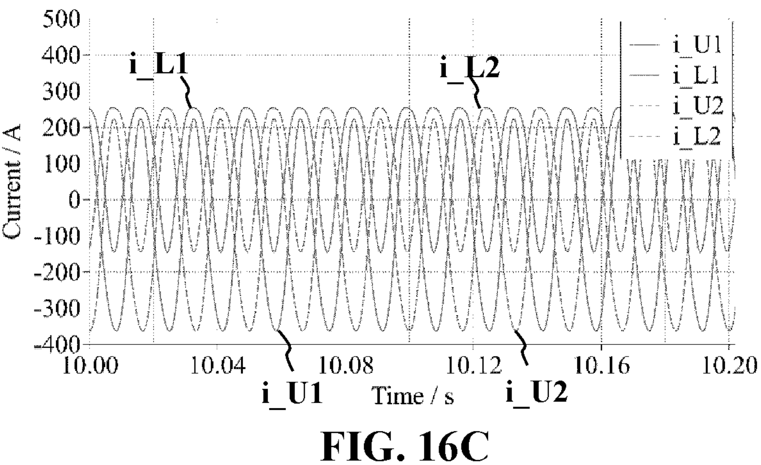

The operation of the converter (10*a*) in FIG. 1A was verified through simulations conducted in PLECS software (Plexim GmbH; Zurich; Switzerland) using a detailed switched model with 10 HBSMs (100) per arm. A 'sort and selection' algorithm was utilized for balancing individual capacitor voltages within each arm. Simulation parameters are detailed in Table VI. Under open loop analysis, several simulations were carried out at different $G_V$ values, i.e. 0.4, 0.5 and 0.6, and observed waveforms are presented. FIGS. 14A to 14C presents the input and output voltages; FIGS. 15A to 15C shows the sum capacitor voltages; and FIGS. 16A to 16C shows arm currents; all at different $G_V$ values of 0.4 (FIGS. 14A, 15A, and 16A), 0.5 (FIGS. 14B, 15B, and 16B), and 0.6 (FIGS. 14C, 15C, and 16C).

TABLE VI

| Simulation parameters for $G_v$ = 0.4, 0.5. 0.6 operating points | | | |
|---|---|---|---|
| Converter Parameters | $G_v = 0.4$ | $G_v = 0.5$ | $G_v = 0.6$ |
| Rated power ($P_{in}$) | | 6 MVA | |
| Input Voltage Peak ($\hat{V}_{aci}$) | | 20 kV | |
| Output Voltage Peak ($\hat{V}_{aco}$) | 8 kV | 10 kV | 12 kV |
| SMs per arm ($n_u$, $n_l$) | 12, 10 | 10, 10 | 10, 12 |
| Average HBSM cap. voltage | | 2 kV | |
| SM capacitance | | 10 mF | |
| Arm inductances | | 10 mH | |
| Filter Capacitance | | 500 uF | |
| Fundamental frequency | | 60 Hz | |

Figure 17:
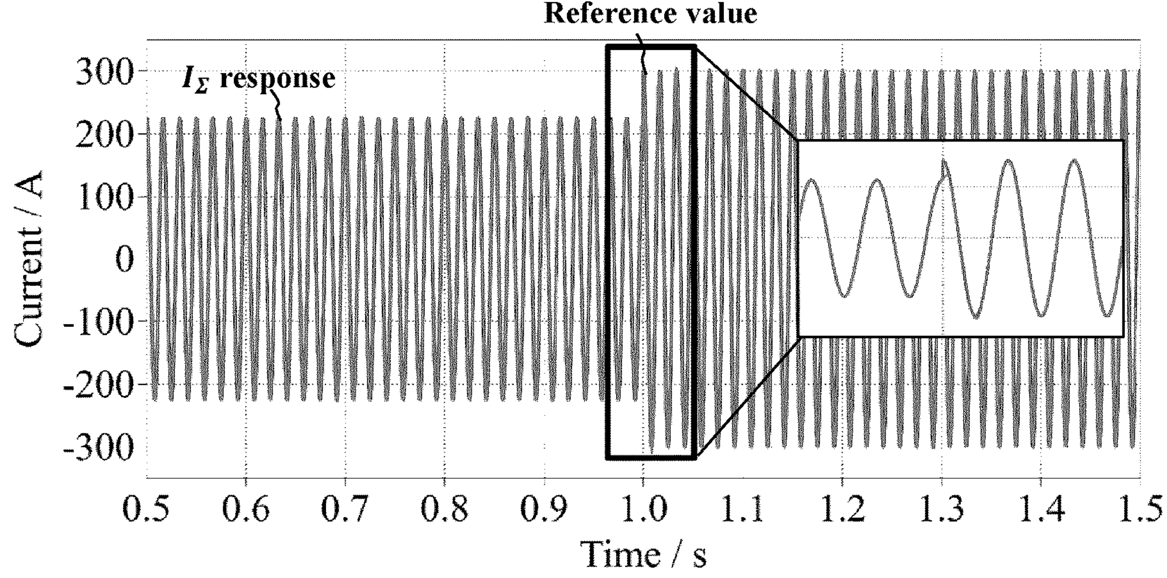
FIG. 17 shows simulation results of controlled common mode current $I_\Sigma$ of a single arm of the converter topology of FIG. 1A, with its reference value, at $G_v$=0.5; an inset portion of FIG. 17 shows a portion of the simulation results at an enlarged charting scale.

Next the performance of the proposed control scheme of FIGS. 13A to 13D for $$G_V = \frac{20\text{ kV}}{10\text{ kV}} = 0.5$$

was tested through simulations. The output power is controlled by regulating AC current $I_\Sigma$. FIG. 17 shows the $I_\Sigma$ response when the transferred power level is changed from 75% to 100% at t=1.0 s. As each arm carries ¼ of the AC output current (see FIG. 4 for currents in one phase leg), 300 A of peak current ($\hat{I}_\Sigma$) corresponds to 1200 A of output current peak, which is the rated load current for 6 MW power transfer. Note, for 75% of the rated power, $\hat{I}_\Sigma$ is 225 A as shown in FIG. 17 for t<1.0 s. Although not explicitly shown here, reversal of power flow (i.e. power flow from $V_{aco}$ to $V_{aci}$) can be achieved by reversing the phase of the reference for $i_\Sigma$ (assuming a fixed $V_{aco}$), in which case the DC circulating current $I_{circ}$ would also change polarity to accommodate the resulting change in direction of inter-arm DC power exchange.

Figure 18:
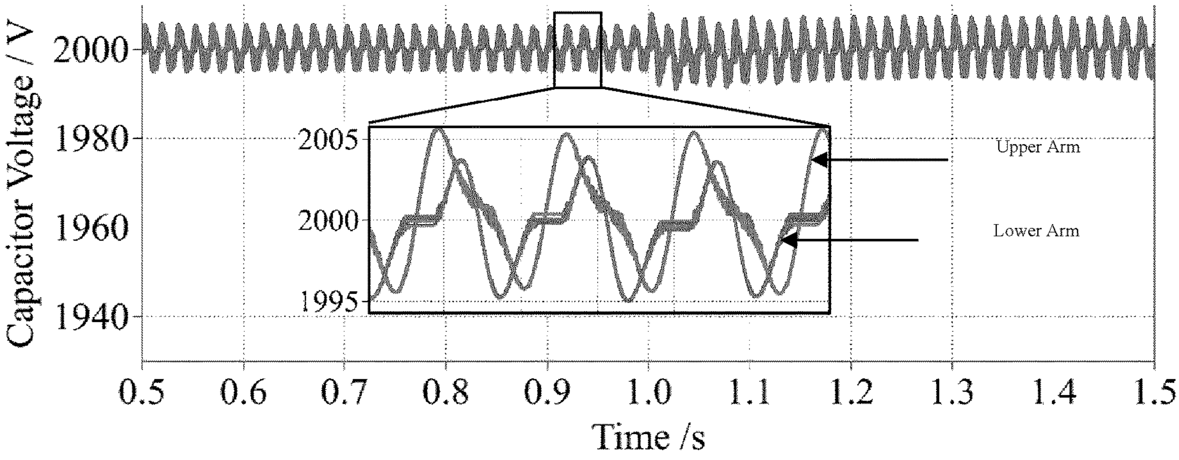
FIG. 18 shows simulation results of submodule capacitor voltages of Leg 1 for converter topology of FIG. 1A, at $G_v$=0.5: an inset portion of FIG. 18 shows a portion of the simulation results at enlarged charting scale.
Figure 19:
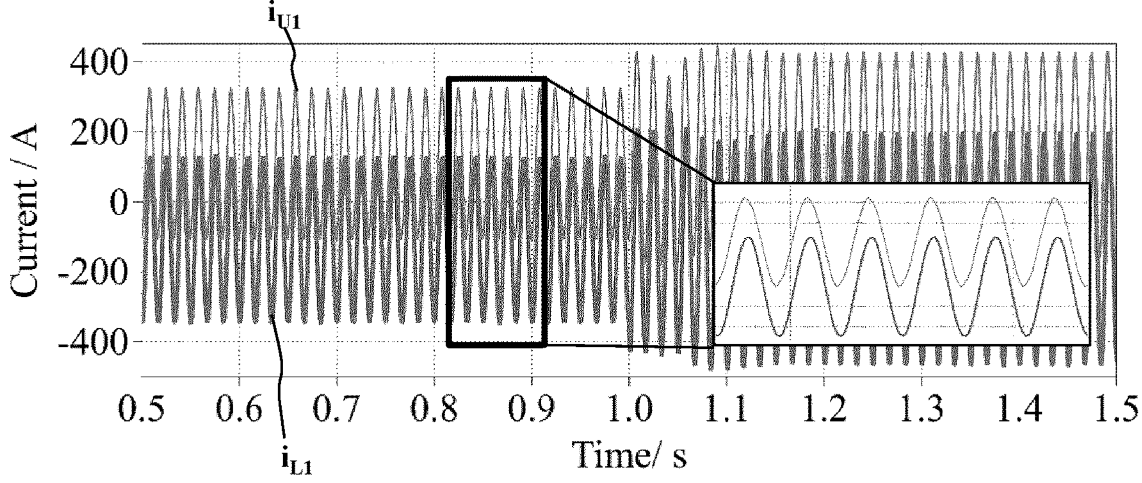
FIG. 19 shows simulation results of arm currents for the converter topology of FIG. 1A, at $G_v$=0.5 for $i_{U1}$ and $i_{L1}$; an inset portion of FIG. 19 shows a portion of the simulation results at enlarged charting scale.
Figure 20A:
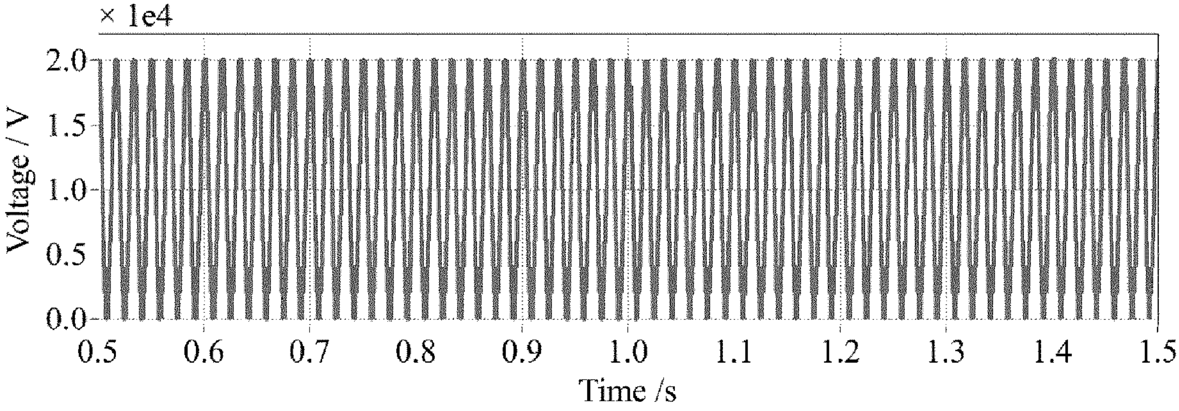
FIGS. 20A-B shows simulation results of arm voltages of Leg 1 of the converter topology of FIG. 1A, at $G_v$=0.5.
Figure 20B:
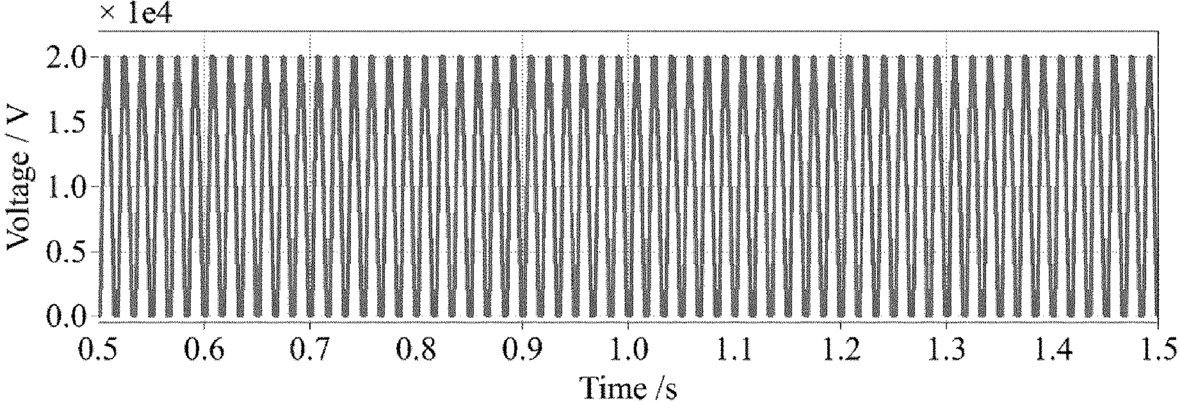

The capacitor voltage controllers keep the capacitor voltages balanced at $\hat{V}_{aci}/10$=2 kV at all times (including the power changing transients) as demonstrated in FIG. 18 showing simulation results of submodule capacitor voltages of Leg 1 for converter (10*a*) of FIG. 1A, at $G_V$=0.5. FIG. 19 showing simulation results of arm voltages of Leg 1 of the converter (10*a*) confirms the arm currents in the first phase leg include both AC and DC components; the latter corresponds to the DC circulating current $I_{circ}$ necessary for capacitor charge balancing. FIGS. 20A and 20B shows the upper arm voltage and the lower arm voltage, respectively, of the first leg.

Experimental Results

Figure 21:
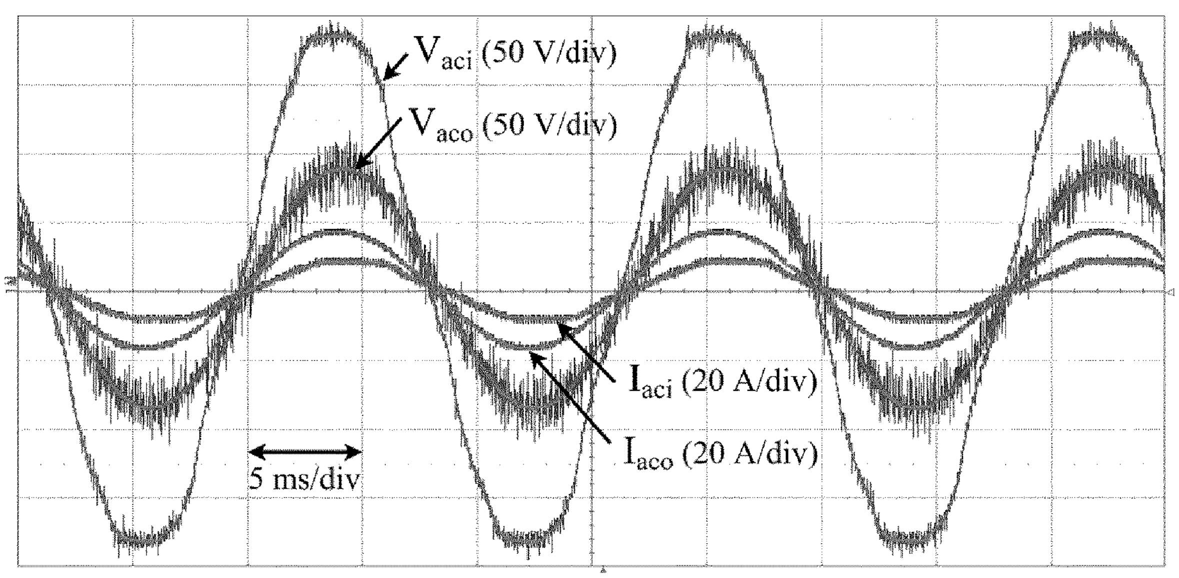
FIG. 21 shows experimental results of input, output voltages and currents for a prototype MMC AC-AC converter of the present invention in accordance with the topology of FIG. 1A.
Figure 22:
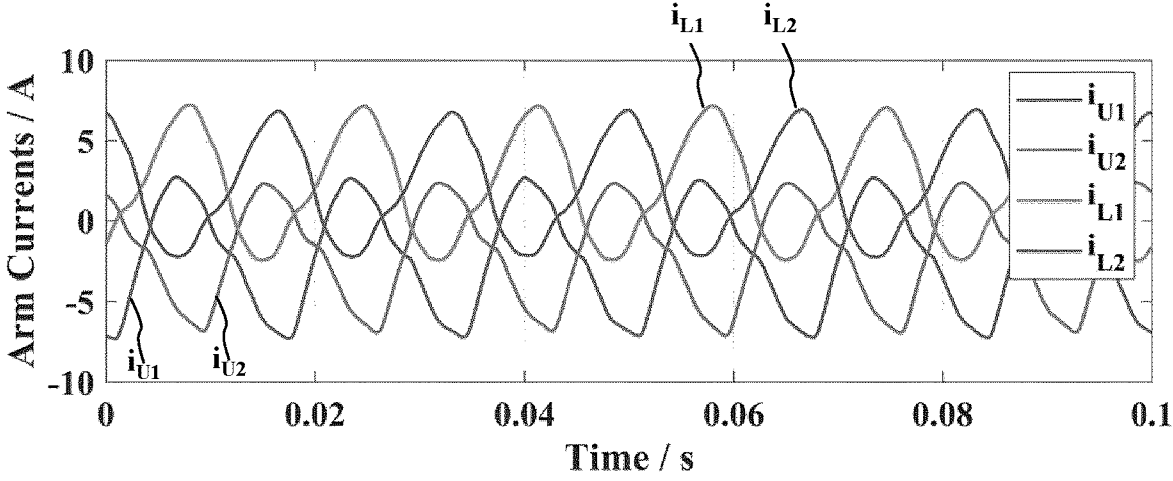
FIG. 22 shows experimental results of currents in all four arms for a prototype MMC AC-AC converter of the present invention in accordance with the topology of FIG. 1A.
Figure 23:
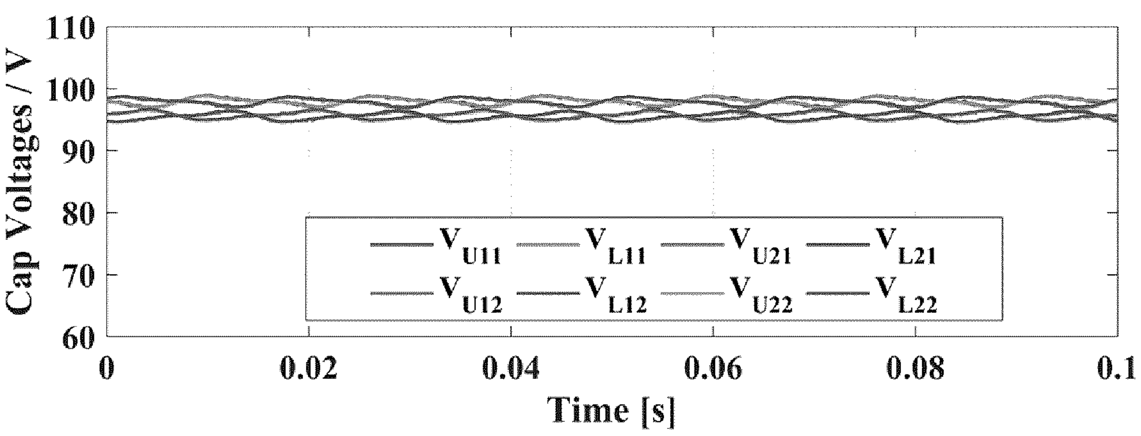
FIG. 23 shows experimental results for submodule capacitor voltages in all four arms for a MMC prototype AC-AC converter of the present invention in accordance with the topology of FIG. 1A.

A scaled down prototype converter in accordance with the topology of FIG. 1A, was built with $V_{aci}$ of 135 $V_{rms}$, $P_{in}$ of 800 W, $L_{au}$=$L_{al}$=2.5 mH and two HBSMs per arm ($n_u$=$n_l$=2, $V_{cap}$=96 V), with $\omega_1$=2π60 rad/sec and $f_{switch}$=6 KHz. Imperix-PEH2015™ (Imperix Ltd; Sion, Switzerland) modules with 5 mF of $C_{sm}$ were used as the HBSM submodules; while this PEH2015™ is a full-bridge submodule, it was adapted to implement it a half-bridge submodule in the prototype converter by leaving one of the two legs disconnected. The B-BOX 3.0™ controller (Imperix Ltd; Sion, Switzerland) was used for pulse-width modulation signal generation and data acquisition. Results are shown in FIGS. 21-23 for an AC voltage ratio of $G_V$=0.5 (135 $V_{rms}$/67 $V_{rms}$). FIG. 21 shows the input and output AC currents and voltages. FIGS. 22 and 23 show the arm currents and HBSM capacitor voltages, respectively, ($V_{U11}$ refers to 1st leg upper arm 1st capacitor voltage in FIG. 1A). Those waveforms were captured from the Imperix™ real time control platform. The waveforms confirm single-stage AC-AC conversion is achieved while maintaining balanced capacitor voltages. The arm currents contain a small 2nd harmonic component that can be mitigated with the suppression controls in FIGS. 13A to 13D.

Alternative Embodiments

Whereas specific embodiments of the invention are shown herein, variations are possible. For example, the passive and active filter implementations shown in FIG. 1A and FIG. 6A are merely examples of possible filter types. Other filter designs achieving the necessary waveform attenuation may be used; one such example is given in FIG. 6B.

FIGS. 6B and 6C show the converter using active filtering with submodules. These filter modules also can contribute to the overall output-to-input voltage conversion ratio, e.g., the filters provide the requisite fundamental frequency voltage injection in combination with the other arms. This may require the filters to handle DC currents to ensure their submodule capacitor charge balance.

The converter (10) may provide AC voltage level conversion between input and output using only half-bridge submodules. However, other submodule types such as full-bridge or other submodules that can function similar to full-bridge submodules in certain situations, such as the clamp-double-submodule, may also be used to provide additional features such as, for example, increased voltage injection capability or enhanced fault blocking capability, through the ability to inject negative voltages. Also, it should be understood that a hybrid mixture of different submodule types can be deployed in the arms and/or filters.

Figure 24:
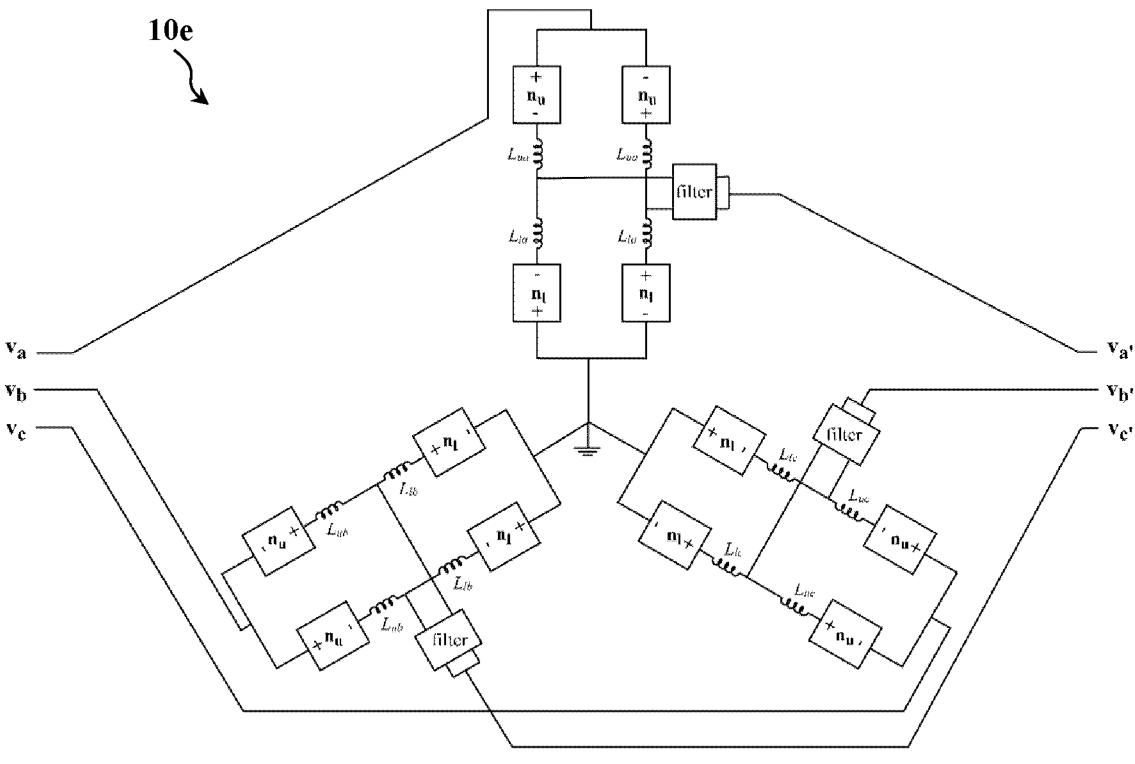
FIG. 24 shows a circuit topology for a fifth embodiment of a MMC AC-AC converter of the present invention, having a three-phase arrangement.
Figure 25A:
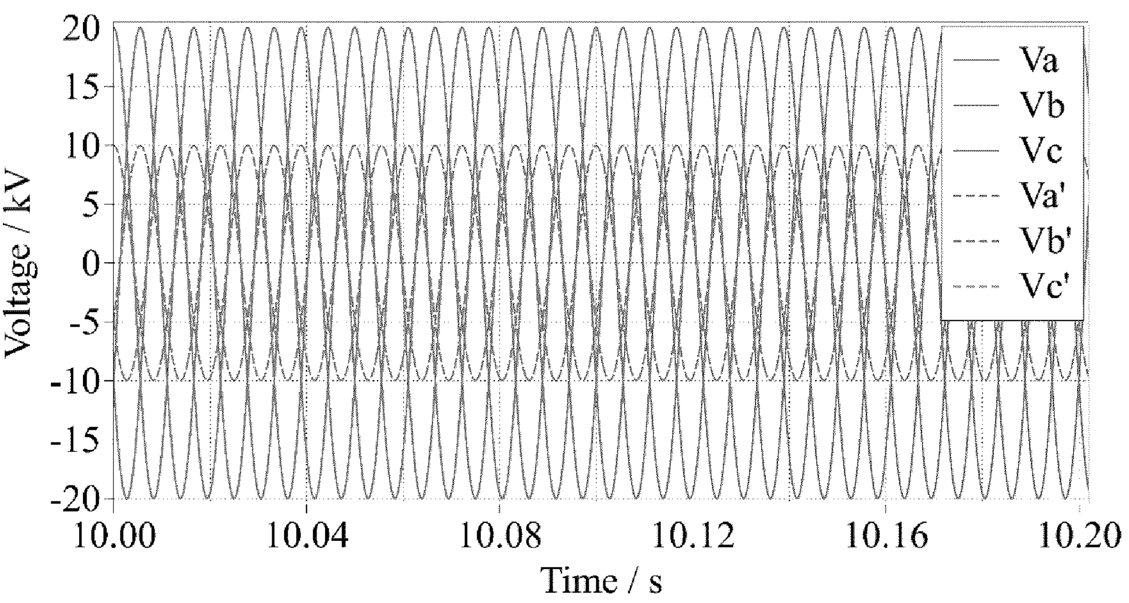
FIG. 25A shows simulation results of input and output voltages for the converter topology of FIG. 24.
Figure 25B:
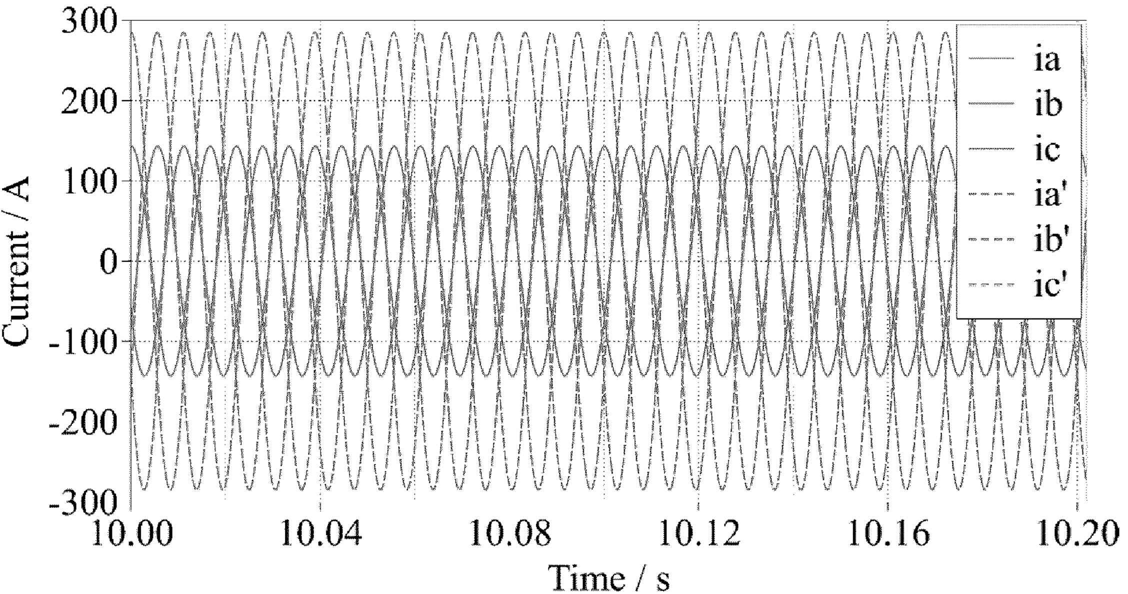
FIG. 25B shows simulation results of input and output currents for the converter topology of FIG. 24.
Figure 26A:
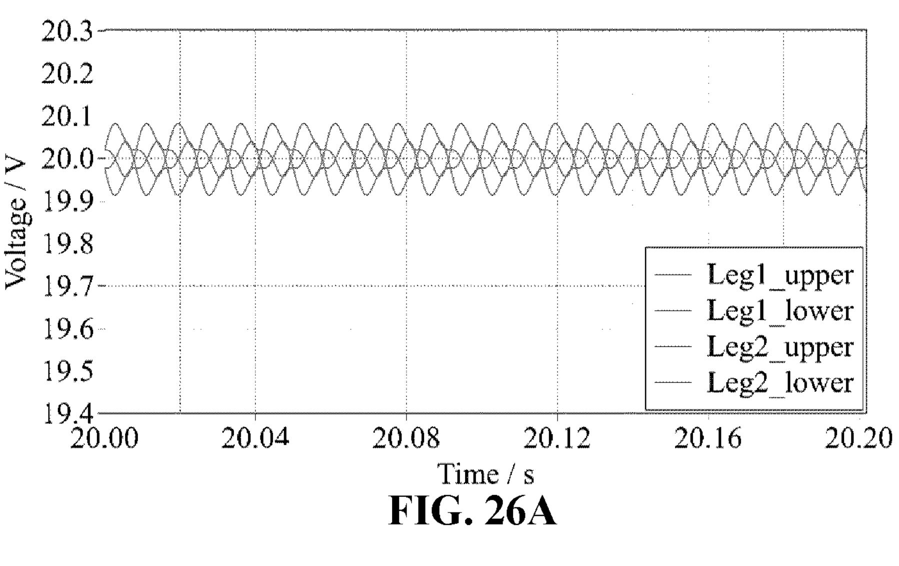
FIGS. 26A to 26C shows simulation results of sum capacitor voltages of legs of a first phase leg (FIG. 26A), and second phase leg (FIG. 26B) and a third phase leg for the converter topology of FIG. 24.
Figure 26B:
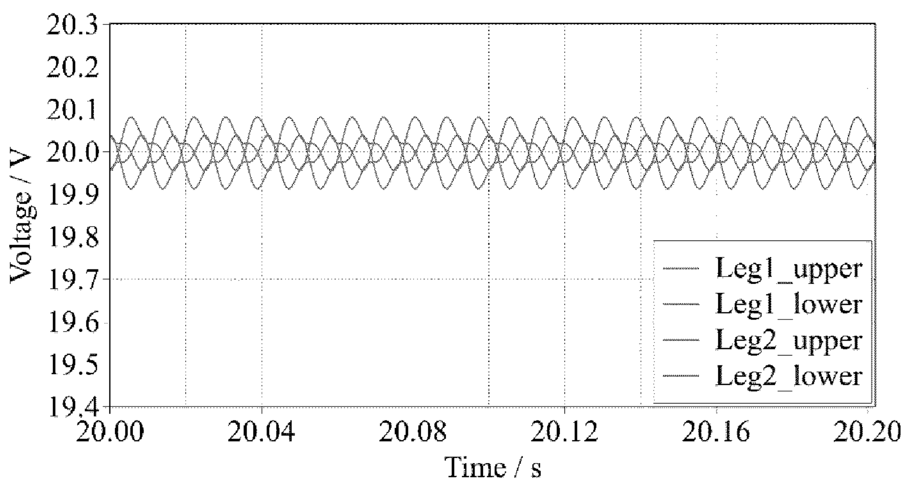
Figure 26C:
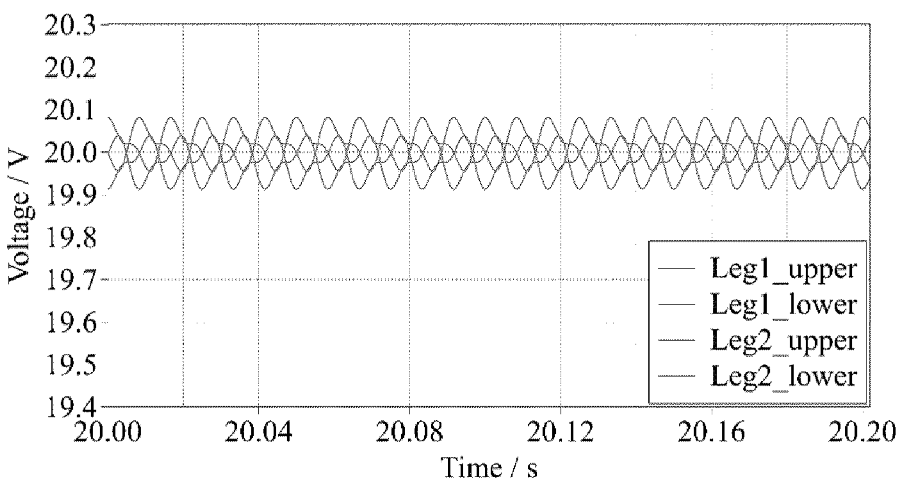

The converter (10) described herein allows direct conversion of AC power between different voltage levels in single-phase AC systems. However, the converter (10) topology can be easily used to accommodate three-phase AC power systems, including, but not limited to, the example shown in FIG. 24 of an embodiment of a converter (10*e*) having a three-phase arrangement, based on a wye connection. A delta connection of converter (10*e*) blocks may also be possible. Basic open loop simulation results of the three-phase converter (10) in FIG. 24 are presented in FIG. 25A for input and output voltages, FIG. 25B for input and output currents, FIGS. 26A to 26B for sum capacitor voltages of the legs of the three different phase legs.

In some embodiments, the converter (10) may be designed to provide step-up voltage level conversion, i.e., designed for applications requiring $G_v$>1, by using the appropriate submodule types and modulation strategies. The converter (10) may then be used to interface two AC systems of substantially similar voltage levels, by controlling the converter (10) to operate with $G_v$ values both below and above 1. For example, full-bridge type submodules may be provided in certain (or all) arms and/or filters of the converter (10) to enable step-up operation.

Figure 29A:
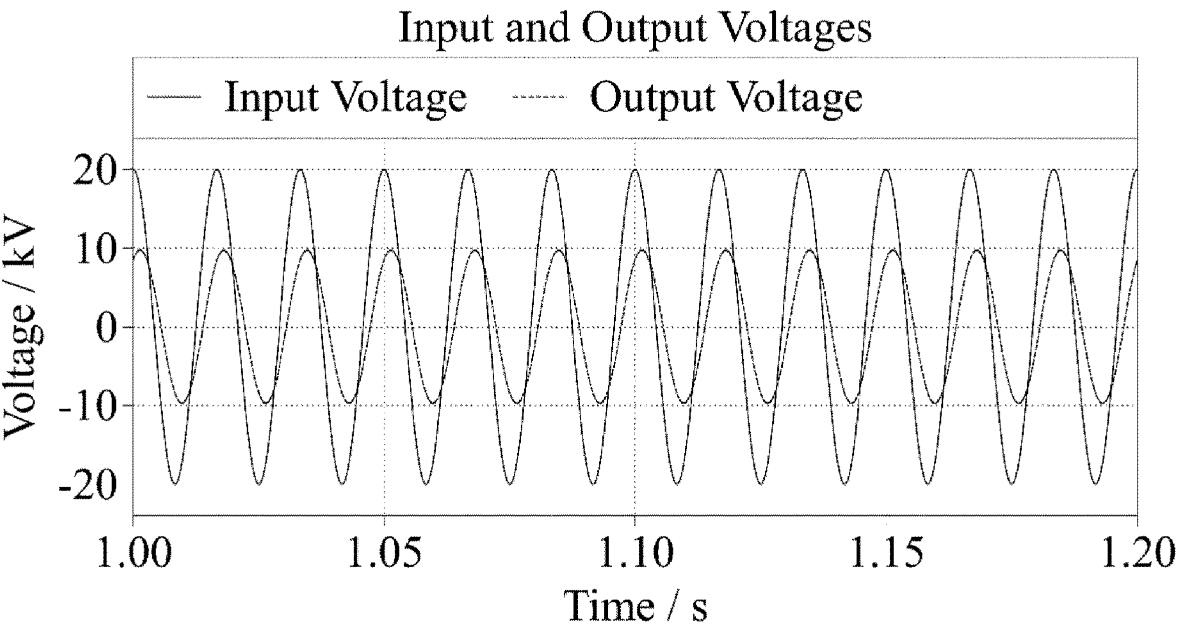
FIGS. 29 to 30 show simulation results of the converter topology in FIG. 1A, at $G_v$=0.5 with an output voltage phase change of −30° relative to the input and showing: simulation results of input and output voltage (FIG. 29A), simulation results of input and output currents (FIG. 29B), and simulation results of submodule capacitor voltages of both legs (FIG. 30).
Figure 29B:
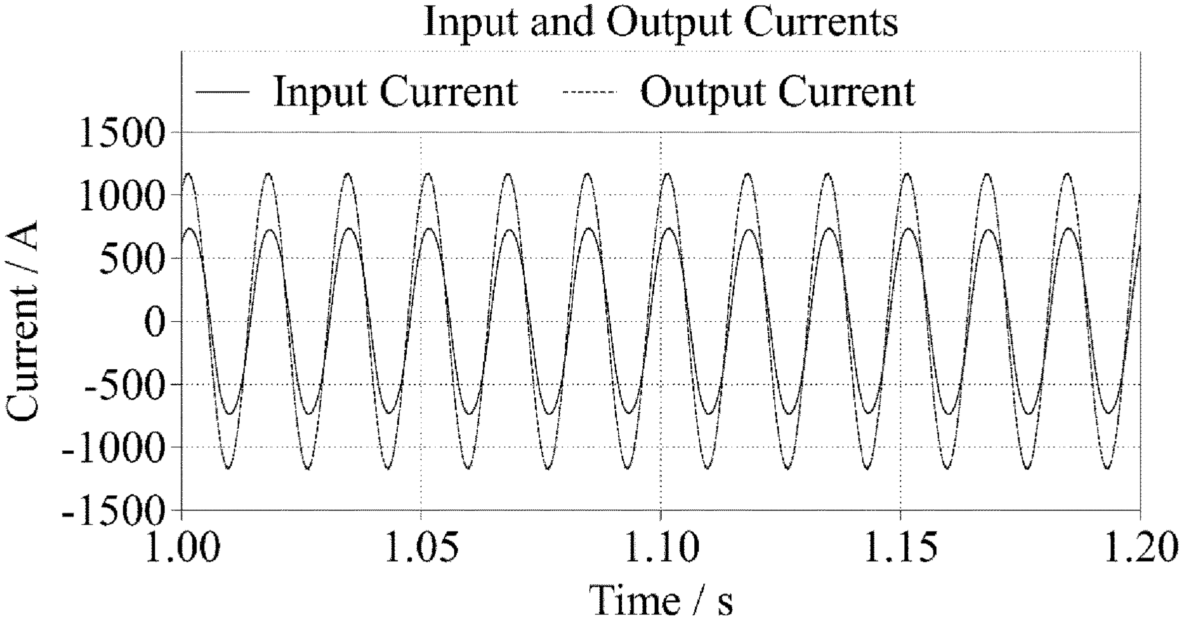
Figure 30:
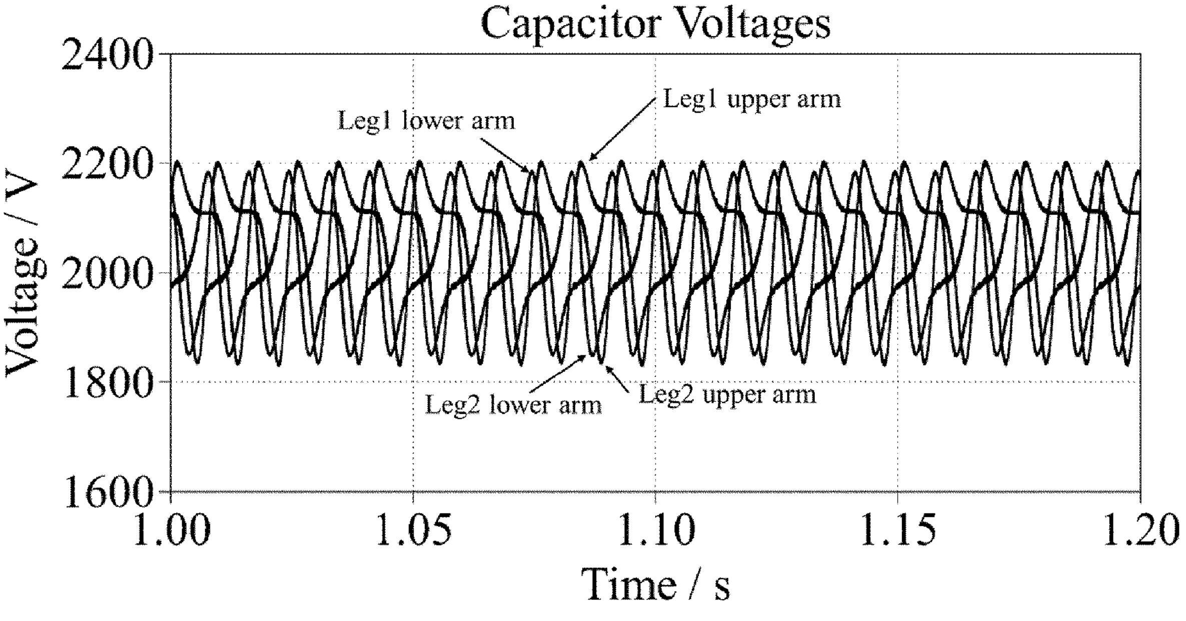

The converter (10) may be configured to accommodate phase shifts between input and output side AC voltages, i.e., it is not essential that the input and output side AC voltages of the converter (10) be in phase. This may be required or desired in certain applications, for example, when interconnecting two AC systems with a phase shift between them or having the converter act analogous to a phase-shifting transformer. Furthermore, the converter (10) may be configured to provide reactive power compensation to the interfacing AC power system(s). Basic open loop simulation results that illustrate the phase changing capability of the converter (10) in FIG. 24 are presented (assuming a phase change of $$\theta_{Gv} = -30^\circ \text{ at } \frac{\hat{V}_{aco}}{\hat{V}_{aci}} = 0.5\Bigg)$$

for input and output voltages (FIG. 29A), input and output currents (FIG. 29B), and for submodule capacitor voltages of the phase legs (FIG. 30).

Figure 27:
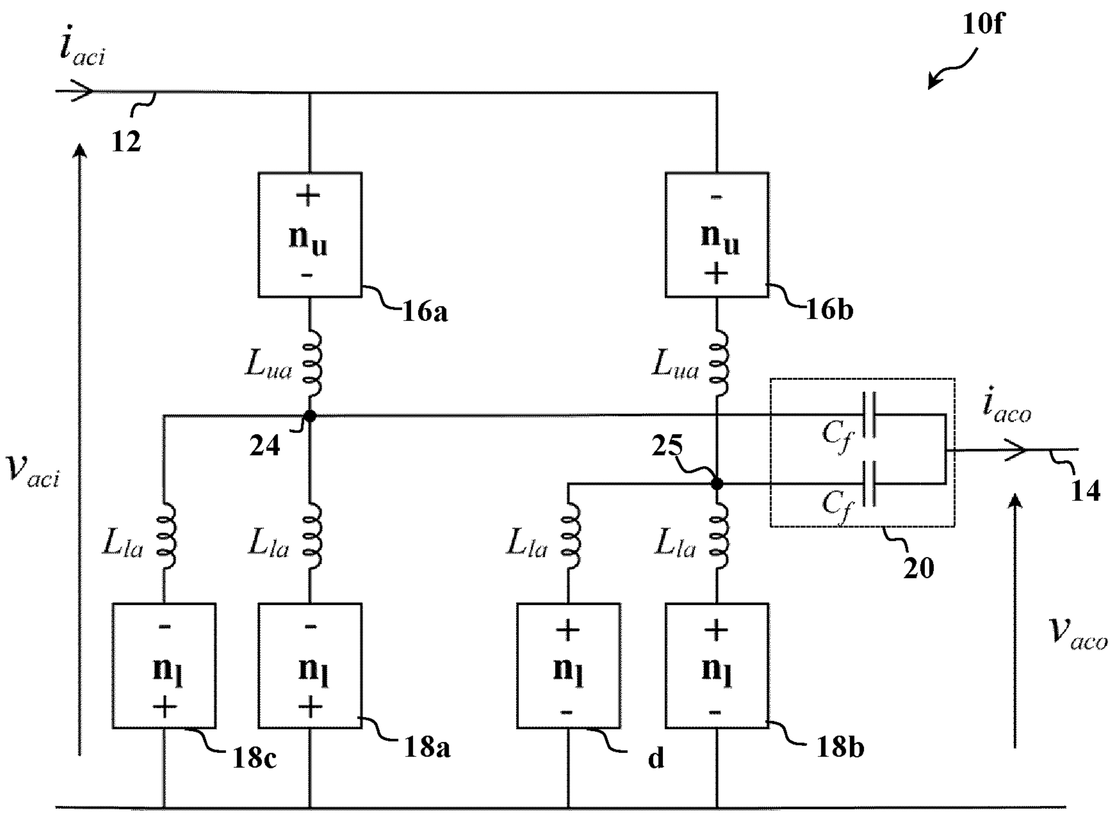
FIG. 27 shows a circuit topology for a sixth embodiment of an AC-AC converter of the present invention, including parallel arms to facilitate high power transfer at low conversion ratios.

In some embodiments, the arms may comprise two or more sets of cascaded HBSM submodules connected in parallel, for example, as shown in the embodiment of the converter (10*f*) of FIG. 27 where the lower arms comprise two sets (18*a* and 18*c*: or 18*b* and 18*d*) of parallel connected cascaded submodules. This configuration is of practical importance as it avoids de-rating of the converter (10)'s output power when operating with high power transfer levels at lower values of $G_v$. In some embodiments, the upper arms may be paralleled to accommodate operating points where relatively high currents exist in the upper arms.

As well, whereas specific operating conditions and parameters are disclosed as part of the simulations and experiments and others, persons of ordinary skill will understand that these are included for illustration, only, and are not intended to be limiting.

Exemplary Aspects

In view of the described apparatuses, and methods and variations thereof, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1A: A modular multilevel converter (MMC) for AC to AC power conversion, the converter comprising an input terminal for receiving input AC current, an output terminal for outputting output AC current, and at least one converter module comprising: (a) a circuit loop connected to the input terminal, and comprising at least one phase leg, wherein each of the at least one phase leg comprises: (i) an upper arm comprising an upper set of at least one series-connected half-bridge submodule; and (ii) a lower arm comprising a lower set of at least one series-connected half-bridge submodule, wherein, within each of the at least one phase leg, the upper and lower sets are connected in series with each other at a connection point, and oppositely oriented to each other to allow for DC power exchange between the upper and lower arm for charge balancing between capacitors of the at least one half-bridge submodule of the upper set and capacitors of the at least one half-bridge submodule of the lower set; and (b) a filter connected to the connection point and the output terminal, wherein the filter comprises one or more components allowing flow of AC current from the connection point of the circuit loop to the output terminal.

Aspect 1B: A method for operating a modular multilevel converter (MMC) for AC to AC power conversion, the method comprising: applying input AC current at an input terminal of at least one converter module of the converter, wherein the at least one converter modules comprises: (a) a circuit loop connected to the input terminal, and comprising at least one phase leg, wherein each of the at least one phase legs comprises: (i) an upper arm comprising an upper set of at least one series-connected half-bridge submodule; and (ii) a lower arm comprising a lower set of at least one series-connected half-bridge submodule, wherein, within each of the at least one phase leg, the upper and lower sets are connected in series with each other at a connection point and oppositely oriented to each other to allow for DC power exchange between the upper and lower arm for charge balancing between capacitors of the at least one half-bridge submodule of the upper set and capacitors of the at least one half-bridge submodule of the lower set: (b) a filter connected to the connection point and an output terminal of the converter, wherein the filter comprises one or more components to allow for flow of AC current from the connection point of the circuit loop to the output terminal; and generating converted output AC current at the output terminal.

Aspect 1C: A modular multilevel converter (MMC) for AC to AC power conversion, the converter comprising an input terminal for receiving input AC current, an output terminal for outputting output AC current, and at least one converter module comprising: (a) a circuit loop connected to the input terminal, and comprising at least one phase leg, wherein each of the at least one phase leg comprises: (i) an upper arm comprising an upper set of at least one series-connected capacitor-based switching submodule; and (ii) a lower arm comprising a lower set of at least one series-connected capacitor-based switching submodule, wherein, within each of the at least one phase leg, the upper and lower sets are connected in series with each other at a connection point, and oppositely oriented to each other to allow for DC power exchange between the upper and lower arm for charge balancing between capacitors of the at least one capacitor-based switching submodule of the upper set and capacitors of the at least one capacitor-based switching submodule of the lower set; and (b) a filter connected to the connection point and the output terminal, wherein the filter comprises one or more components allowing flow of AC current from the connection point of the circuit loop to the output terminal.

Aspect 1D: A method for operating a modular multilevel converter (MMC) for AC to AC power conversion, the method comprising: applying input AC current at an input terminal of at least one converter module of the converter, wherein the at least one converter modules comprises: (a) a circuit loop connected to the input terminal, and comprising at least one phase leg, wherein each of the at least one phase legs comprises: (i) an upper arm comprising an upper set of at least one series-connected capacitor-based switching submodule; and (ii) a lower arm comprising a lower set of at least one series-connected capacitor-based switching submodule, wherein, within each of the at least one phase leg, the upper and lower sets are connected in series with each other at a connection point and oppositely oriented to each other to allow for DC power exchange between the upper and lower arm for charge balancing between capacitors of the at least one capacitor-based switching submodule of the upper set and capacitors of the at least one capacitor-based switching submodule of the lower set: (b) a filter connected to the connection point and an output terminal of the converter, wherein the filter comprises one or more components to allow for flow of AC current from the connection point of the circuit loop to the output terminal; and generating converted output AC current at the output terminal.

Aspect 2: The MMC of any one of Aspects 1A and 1C, the method of any one of Aspects 1B and 1D wherein within the upper arm or lower arm, the at least one series-connected half-bridge submodule comprises a plurality of series-connected half-bridge submodules.

Aspect 3: The MMC of any one of Aspects 1A, 1C and 2, the method of any one of Aspects 1B, 1D and 2, wherein a different number of series-connected half-bridge submodules are located in the upper arm and lower arm.

Aspect 4: The MMC of any one of Aspects 1A, 1C and 2 to 3, the method of any one of Aspects 1B, 1D and 2 to 3, wherein within the at least one phase leg, a DC voltage is generated between the upper and lower arms consequent of the DC power exchange.

Aspect 5: The MMC of any one of Aspects 1A, 1C and 2 to 4, the method of any one of Aspects 1B, 1D and 2 to 4, wherein the at least one phase leg comprises a first phase leg and a second phase leg, and a first connection point connects the upper and lower sets of the first phase leg, and a second connection point connects the upper and lower sets of the second phase leg.

Aspect 6: The MMC of any one of Aspects 1A, 1C and 2 to 5, the method of any one of Aspects 1B, 1D and 2 to 5, wherein the at least one half-bridge submodule of the upper and lower arms of the first phase leg, and the at least one half-bridge submodule of the upper and lower arms of the second phase leg, are oriented to allow for flow of a circulating current through the first and second phase legs of the current loop.

Aspect 7: The MMC of any one of Aspects 1A, 1C and 2 to 6, the method of any one of Aspects 1B, 1D and 2 to 6, wherein the filter is connected in series with, and in between the first connection point and the second connection point.

Aspect 8: The MMC of any one of Aspects 1A, 1C and 2 to 7, the method of any one of Aspects 1B, 1D and 2 to 7, wherein the filter is adapted to impede flow of DC current from the first and second connection points to the output terminal.

Aspect 9: The MMC of any one of Aspects 1A, 1C and 2 to 8, the method of any one of Aspects 1B, 1D and 2 to 8, wherein the filter is adapted to allow flow of DC current between the first and second connection points of the circuit loop.

Aspect 10: The MMC of any one of Aspects 1A, 1C and 2 to 9, the method of any one of Aspects 1B, 1D and 2 to 9, wherein the filter is a first filter and the at least one phase leg comprises a phase leg, and the circuit loop further comprises: a second filter attached in parallel to the phase leg and coupled to the input terminal, wherein the second filter and the at least one half bridge submodule of the upper and lower arms of the phase leg, are oriented to allow for a flow of circulating current though the phase leg and the second filter.

Aspect 11: The MMC of any one of Aspects 1A, 1C and 2 to 10, the method of any one of Aspects 1B, 1D and 2 to 10, wherein the first filter is a high pass filter that blocks DC flow, and the second filter is a low pass filter that passes DC current flow.

Aspect 12: The MMC of any one of Aspects 1A, 1C and 2 to 11, the method of any one of Aspects 1B, 1D and 2 to 11, wherein the one or more components, of the filter, are selected from a group comprising: capacitors, inductors, resistors and active submodules.

Aspect 13: The MMC of any one of Aspects 1A, 1C and 2 to 12, the method of any one of Aspects 1B, 1D and 2 to 12, wherein the active submodules comprise half-bridge submodules.

Aspect 14: The MMC of any one of Aspects 1A, 1C and 2 to 13, the method of any one of Aspects 1B, 1D and 2 to 13, wherein the at least one converter module is coupled to at least one controller configured to generate and transmit modulating signals.

Aspect 15: The MMC of any one of Aspects 1A, 1C and 2 to 14, the method of any one of Aspects 1B, 1D and 2 to 14, wherein the at least one controller comprises a common mode current controller for controlling a fundamental AC current inside the at least one converter, and regulating the at least one converter's output power flow.

Aspect 16: The MMC of any one of Aspects 1A, 1C and 2 to 15, the method of any one of Aspects 1B, 1D and 2 to 15, wherein the common mode current controller comprises a proportional-integral-resonator (PIR) regulator that tracks AC references in the stationary frame with zero state error.

Aspect 17: The MMC of any one of Aspects 1A, 1C and 2 to 16, the method of any one of Aspects 1B, 1D and 2 to 16, wherein the common mode current controller further comprises a phase lead compensator.

Aspect 18: The MMC of any one of Aspects 1A, 1C and 2 to 17, the method of any one of Aspects 1B, 1D and 2 to 17, wherein the at least one controller comprises a second harmonic suppression controller for suppressing unwanted second harmonic circulating AC current.

Aspect 19: The MMC of any one of Aspects 1A, 1C and 2 to 18, the method of any one of Aspects 1B, 1D and 2 to 18, wherein the second harmonic suppression controller comprises a proportional-resonant (PR) regulator, and a feed forward control for decoupling disturbances.

Aspect 20: The MMC of any one of Aspects 1A, 1C and 2 to 19, the method of any one of Aspects 1B, 1D and 2 to 19, wherein the at least one controller is used for regulating submodule capacitor voltage by controlling the common mode voltage and the differential voltage.

Aspect 21: The MMC of any one of Aspects 1A, 1C and 2 to 20, the method of any one of Aspects 1B, 1D and 2 to 20, wherein the at least one controller comprises: (i) a resonant controller in an inner current loop for regulating the fundamental AC current, and (ii) a proportion integral (PI) controller on an outer voltage loop, wherein the resonant controller and the PI controller are used for controlling the command mode voltage; two PI controllers in the inner current loop and an outer voltage loop to control DC current, wherein the two PI controllers are used for controlling the differential mode voltage, Aspect 22: The MMC of any one of Aspects 1A, 1C and 2 to 21, the method of any one of Aspects 1B, 1D and 2 to 21, wherein the at least one controller controls a circulating DC current to counter the fundamental AC power imbalance between the upper and lower arms in each of the at least one phase leg.

Aspect 23: The MMC of any one of Aspects 1A, 1C and 2 to 22, the method of any one of Aspects 1B, 1D and 2 to 22, wherein the at least one converter module is configured to provide a voltage phase shift at the output terminal relative to the input terminal.

Aspect 24: The MMC of any one of Aspects 1A, 1C and 2 to 23, the method of any one of Aspects 1B, 1D and 2 to 23, wherein the one or both of the upper and lower sets comprises two or more parallel sets of series-connected half-bridge submodules.

Aspect 25: The MMC of any one of Aspects 1A, 1C and 2 to 24, the method of any one of Aspects 1B, 1D and 2 to 24, wherein the at least one converter module comprises three converter modules, each of the three converter modules having an input terminal coupled to a different phase of AC current.

Aspect 26: The MMC of any one of Aspects 1A, 1C and 2 to 25, the method of any one of Aspects 1B, 1D and 2 to 25, wherein three converter modules are coupled in a wye connection arrangement.

Aspect 27: The MMC of any one of Aspects 1A, 1C and 2 to 26, the method of any one of Aspects 1B, 1D and 2 to 26, wherein the three converter modules are coupled in a delta connection arrangement.

Aspect 28: The MMC of any one of Aspects 1A and 2 to 27, the method of any one of Aspects 1B and 2 to 27 wherein within the at least one phase leg, the upper or lower sets further comprise a series-connected full-bridge submodules or a capacitor-based switching submodule with equivalent functionality to a full-bridge submodule.

Aspect 29: The MMC of any one of Aspects 1C and 2 to 27, the method of any one of aspects 1D and 2 to 26, wherein the capacitor-based switching submodule comprises at least one of a half-bridge submodule, a full-bridge submodule or a submodule with equivalent functionality to a full-bridge submodule.

Aspect 30: A modular multilevel converter (MMC) for AC to AC power conversion, comprising or consisting essentially of any combination of elements or features disclosed herein.

Aspect 31: A method for operating a modular multilevel converter (MMC) for AC to AC power conversion, comprising any combination of steps, elements or features disclosed herein.

Interpretation

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of +5%, +10%, +20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

REFERENCES

All publications, patents and patent applications mentioned in this specification, and/or listed below, are indicative of the level of skill of those skilled in the art to which this invention pertains and are herein incorporated by reference to the same extent as if each individual publication, patent, or patent applications was specifically and individually indicated to be incorporated by reference. The reference numbers below correspond to reference numbers mentioned in the specification above.

[1] M. Glinka and R. Marquardt, "A new AC/AC multilevel converter family," *IEEE Trans. Ind. Electron*., vol. 52, no. 3, pp. 662-669, June 2005.

[2] L. Baruschka and A. Mertens, "A New Three-Phase AC/AC Modular Multilevel Converter With Six Branches in Hexagonal Configuration," *IEEE Trans. Ind. Appl*., vol. 49, no. 3, pp. 1400-1410 May 2013.

[3] Z. He, P. Guo, Z. Shuai, Q. Xu, A. Luo, and J. M. Guerrero, "Modulated Model Predictive Control for Modular Multilevel AC/AC Converter," *IEEE Trans. Power Electron*., vol. 34, no. 10, pp. 10359-10372, October 2019.

[4] P. Blaszczyk, "Hex-Y-A New Modular Multilevel Converter Topology for a Direct AC-AC Power Conversion," 2018 *20th Eur. Conf. Power Electron. Appl. EPE*18 *ECCE Eur.,* 2018.

[5] M. Lei et al., "A Single-Phase Five-Branch Direct AC-AC Modular Multilevel Converter for Railway Power Conditioning," *IEEE Trans. Ind. Electron*., vol. 67, no. 6, pp. 4292-4304, June 2020.

[6] M. Tanta, J. G. Pinto, V. Monteiro, A. P. Martins, A. S. Carvalho, and J. L. Afonso, "Topologies and Operation Modes of Rail Power Conditioners in AC Traction Grids: Review and Comprehensive Comparison," *Energies*, vol. 13, no. 9, Art. no. 9, January 2020.

[7] B. Li, J. Hu, S. Zhou, and D. Xu, "Hybrid back-to-back MMC system for variable speed AC machine drives," *CPSS Trans. Power Electron. Appl.*, vol. 5, no. 2, pp. 114-125, June 2020.

[8] F. Qin, T. Hao, and F. Gao, "A Railway Power Conditioner Using Direct AC-AC Modular Multilevel Converter," in 2019 *2nd International Conference on Smart Grid and Renewable Energy* (*SGRE*), November 2019, pp. 1-5.

[9] J. A. Ferreira, "The Multilevel Modular DC Converter," *IEEE Trans. Power Electron.*, vol. 28, no. 10, pp. 4460-4465, October 2013.

[10] S. Du, A. Dekka, B. Wu, and N. Zargari, *Modular multilevel converters: analysis, control, and applications*. John Wiley & Sons, 2017.

[11] M. Tanta et al., "Simplified rail power conditioner based on a half-bridge indirect AC/DC/AC Modular Multilevel Converter and a V/V power transformer," in IECON 2017—43rd Annual Conference of the IEEE Industrial Electronics Society, October 2017, pp. 6431-6436.

[12] L. Liu and N. Dai, "Hybrid railway power conditioner based on half-bridge modular multilevel converter," in 2016 IEEE Energy Conversion Congress and Exposition (ECCE), September 2016, pp. 1-7.

[13] S. Angkititrakul and R. W. Erickson, "Control and implementation of a new modular matrix converter," in Nineteenth Annual IEEE Applied Power Electronics Conference and Exposition, 2004. APEC '04, February 2004, vol. 2, pp. 813-819 vol. 2.

[14] M. A. Perez, J. Rodriguez, E. J. Fuentes, and F. Kammerer, "Predictive Control of AC-AC Modular Multilevel Converters," IEEE Trans. Ind. Electron., vol. 59, no. 7, pp. 2832-2839, July 2012.

[15] M. Lei et al., "FullDegree of Freedom Based Control Scheme of the Single-Phase Direct AC-AC Modular Multilevel Converter for Railway Power Conditioning Under Asymmetric Branch Conditions," IEEE Trans. Ind. Electron., vol. 67, no. 3, pp. 1671-1683, March 2020.

[16] Lei, Y. Li, Z. Li, F. Xu, C. Zhao, and P. Wang, "A Single-Phase Direct AC-AC Modular Multilevel Converter for Railway Power Conditioning," in 2018 20th European Conference on Power Electronics and Applications (EPE '18 ECCE Europe), September 2018, p. P.1-P.10.

[17] T. Soong and P. W. Lehn, "Internal Power Flow of a Modular Multilevel Converter With Distributed Energy Resources," *IEEE J. Emerg. Sel. Top. Power Electron.*, vol. 2, no. 4, pp. 1127-1138, December 2014.

[18] J. Zhang, Z. Wang and S. Shao, "A three-phase modular multilevel DC-DC converter for power electronic transformer applications", IEEE J. Emerg. Sel. Topics Power Electron., vol. 5, no. 1, pp. 140-150, March 2017.

[19] P. Bravo, J. Pereda, M. M. C. Merlin, S. Neira, T. Green, and F. Rojas, "Modular Multilevel Matrix Converter as Solid State Transformer for Medium and High Voltage Substations," IEEE Trans. Power Deliv., pp. 1-1, 2022.

The invention claimed is:

1. A modular multilevel converter (MMC) for AC to AC power conversion, the converter comprising an input terminal for receiving input AC current, an output terminal for outputting output AC current, and at least one converter module comprising:

(a) a circuit loop connected to the input terminal, and comprising at least one phase leg, wherein each of the at least one phase leg comprises:

(i) an upper arm comprising an upper set of at least one series-connected half-bridge submodule; and (ii) a lower arm comprising a lower set of at least one series-connected half-bridge submodule, wherein, within each of the at least one phase leg, the upper and lower sets are connected in series with each other at a connection point, and oppositely oriented to each other to allow for DC power exchange between the upper and lower arm for charge balancing between capacitors of the at least one half-bridge submodule of the upper set and capacitors of the at least one half-bridge submodule of the lower set; and (b) a filter connected to the connection point and the output terminal, wherein the filter comprises one or more components allowing flow of the AC current from the connection point of the circuit loop to the output terminal.

2. The MMC of claim 1, wherein within the upper arm or lower arm, the at least one series-connected half-bridge submodule comprises a plurality of series-connected half-bridge submodules.

3. The MMC of claim 1 wherein a different number of series-connected half-bridge submodules are located in the upper arm and lower arm.

4. The MMC of claim 1, wherein within the at least one phase leg, a DC voltage is generated between the upper and lower arms consequent of the DC power exchange.

5. The MMC of claim 1, wherein the at least one phase leg comprises a first phase leg and a second phase leg, and a first connection point connects the upper and lower sets of the first phase leg, and a second connection point connects the upper and lower sets of the second phase leg.

6. The MMC of claim 5, wherein the at least one half-bridge submodule of the upper and lower arms of the first phase leg, and the at least one half-bridge submodule of the upper and lower arms of the second phase leg, are oriented to allow for flow of a circulating current through the first and second phase legs of the current loop.

7. The MMC of claim 5, wherein the filter is connected in series with, and in between the first connection point and the second connection point.

8. The MMC of claim 7, wherein the filter is adapted to (i) impede flow of DC current from the first and second connection points to the output terminal or (ii) allow flow of DC current between the first and second connection points of the circuit loop.

9. The MMC of claim 1, wherein the filter is a first filter and the at least one phase leg comprises a phase leg, and the circuit loop further comprises:

a second filter attached in parallel to the phase leg and coupled to the input terminal, wherein the second filter and the at least one half bridge submodule of the upper and lower arms of the phase leg, are oriented to allow for a flow of circulating current though the phase leg and the second filter.

10. The MMC of claim 1, wherein the one or more components; of the filter, are selected from a group comprising: capacitors, inductors, resistors, active submodules and half-bridge submodules.

11. The MMC of claim 1, wherein the at least one converter module is coupled to at least one controller configured to generate and transmit modulating signals.

12. The MMC of claim 11, wherein the at least one controller comprises a common mode current controller for controlling a fundamental AC current inside the at least one converter, and regulating the at least one converter output power flow.

13. The MMC of claim 12, wherein the common mode current controller comprises a proportional-integral-resonator (PIR) regulator that tracks AC references in a stationary frame with zero state error.

14. The MMC of claim 12, wherein the common mode current controller further comprises a phase lead compensator.

15. The MMC of claim 11, wherein the at least one controller comprises a second harmonic suppression controller for suppressing unwanted second harmonic circulating AC current.

16. The MMC of claim 15, wherein the second harmonic suppression controller comprises a proportional-resonant (PR) regulator, and a feed forward control for decoupling disturbances.

17. The MMC of claim 12, wherein the at least one controller is used for regulating submodule capacitor voltage by controlling a common mode voltage and a differential mode voltage.

18. The MMC of claim 17, wherein the at least one controller comprises:

(i) a resonant controller in an inner current loop for regulating the fundamental AC current, and (ii) a proportion integral (PI) controller on an outer voltage loop, wherein the resonant controller and the PI controller are used for controlling the command mode voltage;

two PI controllers in the inner current loop and the outer voltage loop to control DC current, wherein the two PI controllers are used for controlling the differential mode voltage.

19. A method for operating a modular multilevel converter (MMC) for AC to AC power conversion, the method comprising:

applying input AC current at an input terminal of at least one converter module of the converter, wherein the at least one converter module comprises:

(a) a circuit loop connected to the input terminal, and comprising at least one phase leg, wherein each of the at least one phase legs comprises:

(i) an upper arm comprising an upper set of at least one series-connected half-bridge submodule; and (ii) a lower arm comprising a lower set of at least one series-connected half-bridge submodule, wherein, within each of the at least one phase leg, the upper and lower sets are connected in series with each other at a connection point and oppositely oriented to each other to allow for DC power exchange between the upper and lower arm for charge balancing between capacitors of the at least one half-bridge submodule of the upper set and capacitors of the at least one half-bridge submodule of the lower set;

(b) a filter connected to the connection point and an output terminal of the converter, wherein the filter comprises one or more components to allow for flow of the AC current from the connection point of the circuit loop to the output terminal; and generating converted output AC current at the output terminal.

20. A modular multilevel converter (MMC) for AC to AC power conversion, the converter comprising an input terminal for receiving input AC current, an output terminal for outputting output AC current, and at least one converter module comprising:

(a) a circuit loop connected to the input terminal, and comprising at least one phase leg, wherein each of the at least one phase leg comprises:

(i) an upper arm comprising an upper set of at least one series-connected capacitor-based switching submodule; and (ii) an lower arm comprising a lower set of at least one series-connected capacitor-based switching submodule, wherein, within each of the at least one phase leg, the upper and lower sets are connected in series with each other at a connection point, and oppositely oriented to each other to allow for DC power exchange between the upper and lower arm for charge balancing between capacitors of the at least one capacitor-based submodule of the upper set and capacitors of the at least one capacitor-based submodule of the lower set; and (b) a filter connected to the connection point and the output terminal, wherein the filter comprises one or more components allowing flow of the AC current from the connection point of the circuit loop to the output terminal.

* * * * *